United States Patent
Mueck

(10) Patent No.: US 10,779,253 B2
(45) Date of Patent: Sep. 15, 2020

(54) BASE STATION CIRCUITRY FOR ADAPTING OPERATION OF A USER EQUIPMENT BETWEEN STAND-ALONE AND NETWORK ASSISTED OPERATION

(71) Applicant: Intel IP Corporation, Santa Clara, CA (US)

(72) Inventor: Markus Dominik Mueck, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/079,433

(22) PCT Filed: Jan. 30, 2017

(86) PCT No.: PCT/EP2017/051885
§ 371 (c)(1),
(2) Date: Aug. 23, 2018

(87) PCT Pub. No.: WO2017/157559
PCT Pub. Date: Sep. 21, 2017

(65) Prior Publication Data
US 2019/0053186 A1 Feb. 14, 2019

(30) Foreign Application Priority Data
Mar. 17, 2016 (DE) .......................... 10 2016 104 948

(51) Int. Cl.
*H04W 4/00* (2018.01)
*H04W 60/02* (2009.01)
(Continued)

(52) U.S. Cl.
CPC ....... *H04W 60/02* (2013.01); *H04W 36/0016* (2013.01); *H04W 76/23* (2018.02);
(Continued)

(58) Field of Classification Search
CPC ..... H04W 16/12; H04W 16/14; H04W 24/00; H04W 28/08; H04W 36/04; H04W 36/18;
(Continued)

(56) References Cited

U.S. PATENT DOCUMENTS

2004/0176024 A1* 9/2004 Hsu ....................... H04L 12/189
455/3.04
2006/0258358 A1* 11/2006 Kallio ............... H04W 36/0066
455/437
(Continued)

FOREIGN PATENT DOCUMENTS

WO WO-2014/047907 A1 4/2014

OTHER PUBLICATIONS

European Patent Office, PCT International Search Report issued for PCT/EP201//051885, 7 pages, dated May 7, 2017.

*Primary Examiner* — Matthew W Genack
(74) *Attorney, Agent, or Firm* — Schiff Hardin LLP

(57) ABSTRACT

A base station (BS) circuitry, configured to adapt operation of a user equipment (UE) between a stand-alone operation mode and a mobile network operator (MNO) assisted operation mode, includes: a first interface connectable to an MNO network; a second interface connectable to the UE; and a BS controller, configured to: transmit a first register message via the first interface to the MNO network, wherein the first register message indicates a request to operate the UE in at least one licensed frequency band of the MNO network, and signal a hand-over via the second interface to the UE, wherein the hand-over indicates a transition from operating the UE in at least one frequency band of the stand-alone operation mode to operating the UE in the at least one licensed frequency band of the MNO assisted operation mode.

16 Claims, 13 Drawing Sheets

(51) Int. Cl.
  *H04W 76/23* (2018.01)
  *H04W 36/00* (2009.01)
  H04W 88/08 (2009.01)
  H04W 88/06 (2009.01)
(52) U.S. Cl.
  CPC ........ *H04W 36/0069* (2018.08); *H04W 88/06* (2013.01); *H04W 88/08* (2013.01)
(58) Field of Classification Search
  CPC ..... H04W 36/30; H04W 36/32; H04W 48/18; H04W 60/00; H04W 72/04
  USPC .......... 455/435.1–435.3, 436–444, 447–448, 455/450–451, 452.1–452.2, 453–454, 455/453–454
  See application file for complete search history.

(56) References Cited

U.S. PATENT DOCUMENTS

| | | | |
|---|---|---|---|
| 2010/0173586 A1* | 7/2010 | McHenry | H04L 27/0006 |
| | | | 455/62 |
| 2013/0079046 A1* | 3/2013 | Chen | H04W 16/14 |
| | | | 455/509 |
| 2013/0308598 A1 | 11/2013 | Madan et al. | |
| 2015/0055588 A1* | 2/2015 | Yerramalli | H04W 72/0446 |
| | | | 370/329 |
| 2015/0296551 A1 | 10/2015 | Kim et al. | |
| 2017/0034767 A1* | 2/2017 | Griot | H04W 76/14 |
| 2018/0255586 A1* | 9/2018 | Einhaus | H04W 72/02 |
| 2018/0351774 A1* | 12/2018 | Heinikoski | H04L 12/413 |
| 2019/0045484 A1* | 2/2019 | Liu | H04W 72/04 |

\* cited by examiner

BASE STATION CIRCUITRY FOR ADAPTING OPERATION OF A USER EQUIPMENT BETWEEN STAND-ALONE AND NETWORK ASSISTED OPERATION

FIELD

The disclosure relates to a base station (BS) circuitry for adapting operation of a user equipment (UE) between a stand-alone operation mode and a mobile network operator (MNO) assisted operation mode and a UE controlled by such BS circuitry. In particular, the disclosure relates to dynamic combination of stand-alone licensed assisted access (LAA) and dedicated LAA and advanced coexistence mechanisms for unlicensed bands.

BACKGROUND

While 3GPP LAA (Licensed Assisted Access) allows operators to combine dedicated licensed and unlicensed (in particular 5 GHz ISM) bands, this 3GPP LAA approach only allows the joint operation of these 2 bands. As can be seen from FIG. 1, a dedicated licensed spectrum 118, e.g. according to LTE, is provided by a base station 120 to a user with user equipment 140 and an unlicensed spectrum 112, e.g. according to WiFi, is provided by a small cell 110 to the user equipment 140. Both spectra 112, 118 are combined via link aggregation 130. Control 114 and data 116 messages are exchanged between the base station 120 and the small cell 110. Currently, multiple LAA Stand-Alone approaches are defined, typically using the 5 GHz ISM band (or any other suitable unlicensed band or shared bands such as the 3.5 GHz US band) only—without combination with a dedicated licensed band. This makes LTE available for operator-independent users, such as private users deploying a private home network.

It may thus be desirable to provide a new technique for efficiently using radio resources including licensed and unlicensed frequency bands.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
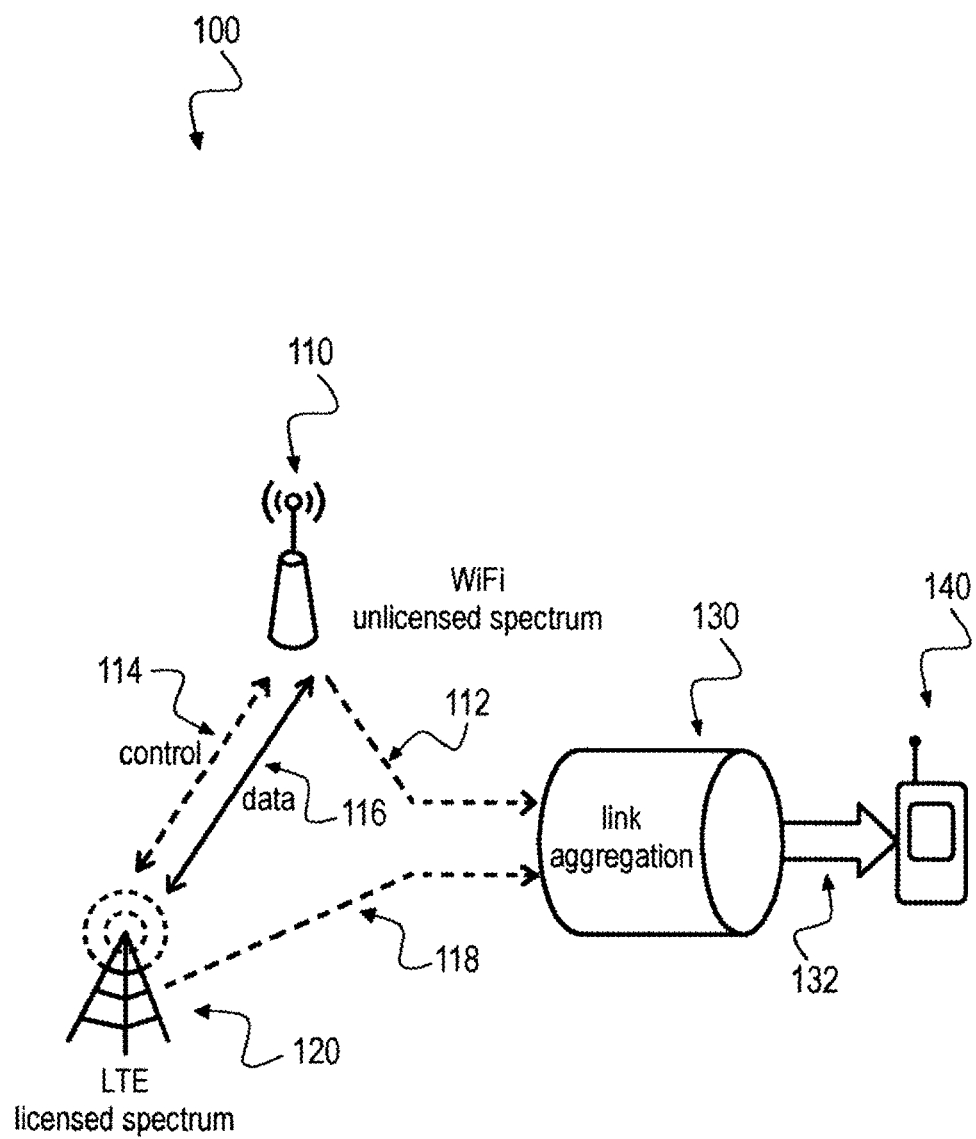
FIG. 1 is a schematic diagram of a joint operation of dedicated licensed and unlicensed frequency bands according to 3GPP LAA.

In the context of this disclosure, "stand-alone" means that the LAA system can be used in an unlicensed or license-by-rule band or shared band (or any band other than exclusively licensed band) alone without requiring a second frequency carrier (being operated jointly, sequentially in time or simultaneously in time). Such a second frequency carrier typically relates to a dedicated licensed frequency band, such as an LTE dedicated licensed frequency band. Also note that the stand-alone system typically relates to LAA but the approach is generic and can be applied to any communication protocol (possibly after suitable modifications, including mechanisms for protection of an incumbent system for example). Also note that the stand-alone system may be part of a hierarchy, for example in the case of LAA in 3.5 GHz shared spectrum, the highest priority is typically given to the incumbent, the second highest priority to a PAL User (Priority Access License User)—if available in the target band—and the third highest priority to a GAA User (General Authorized Access user) which is typically governed under the license-by-rule framework of the FCC (in other regions similar or slightly different schemes may exist which allow quasi-unlicensed operation while protecting a higher priority user).

It is understood that the basic principles are applicable to any suitable frequency band and any suitable radio access technology. In particular, it is suitable for systems operating in unlicensed bands (such as 2.4 GHz ISM band and 5 GHz ISM bands), license-by-rule bands (such as 3.5 GHz GAA operation in the US under FCC's license-by-rule framework), shared bands (such as TVWS bands, e.g. in Europe from 470-790 MHz, where systems as as IEEE802.11af may operate) and any other type of bands. The proposed schemes are in particular optimized for TDD operation, however, they may be adapted to any other type of operation, including FDD. Alternatively, non-TDD systems, such as FDD systems or others, may be adapted in order to operate under the conditions detailed in this disclosure; this may for example be achieved by adding a (optional or non-optional) TDD mode or any other suitable mode to the currently existing stand. Then, the approach detailed in this disclosure can be applied to any communication system and in particular to the following systems: Infrastructure equipment or mobile devices or any other equipment operating according to certain 3GPP (Third Generation Partnership Project) specifications, notably Long Term Evolution (LTE) and Long Term Evolution-Advanced (LTE-A), a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. Note in particular that the proposed scheme may be applied to so called cmWave (3-30 GHz) and mmWave (30-300 GHz) band systems and at frequencies beyond those.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense. The following terms, abbreviations and notations will be used herein.

CRS: Cell specific Reference Signal,
PRB: Physical Resource Block,
3GPP: 3rd Generation Partnership Project,
LTE: Long Term Evolution,
LTE-A: LTE Advanced, Release 10 and higher versions of 3GPP LTE,
MNO: Mobile Network Operator,
BS: Base station, eNodeB,
FCC: Federal Communications Commission,
SAS: Spectrum Access System,
PA: Priority Access,
GAA: General Authorized Access,
PAL: Priority Access Licenses,
ASA: Authorized Shared Access,
CSS: Cloud Spectrum Services,
RF: Radio Frequency,
UE: User Equipment,
SINR: signal-to-interference and noise ratio,
RE: Resource Element,
RB: resource block, e.g., a resource block in frequency direction times slot in time direction,
OFDM: Orthogonal Frequency Division Multiplex,
NodeB: base station,
IRC: Interference Rejection Combining,
eICIC: enhanced Inter-Cell Interference Coordination,
MIMO: Multiple Input Multiple Output,
TDD: Time Division Duplex,
FDD: Frequency Division Duplex, The methods and devices described herein may be based on resource blocks, in particular resource blocks received from radio cells, and clusters. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM.

The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals. The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in SAS systems. The FCC (Federal Communications Commission) released a Report and Order outlining the rules for operating wireless devices in the 3.5 GHz band that spans from 3550-3700 MHz. FCC released this spectrum for sharing with the incumbents, which means that the incumbents get priority in that band and it can be used by broadband devices when (and where) incumbents are not using the spectrum. The incumbents in this band include DoD radars. There are two additional tiers of spectrum users in addition to the incumbents namely the Priority Access (PA) and General Authorized Access (GAA). The Priority Access Licenses (PAL) users get protection from GAA users which is similar to unlicensed spectrum.

Figure 9:
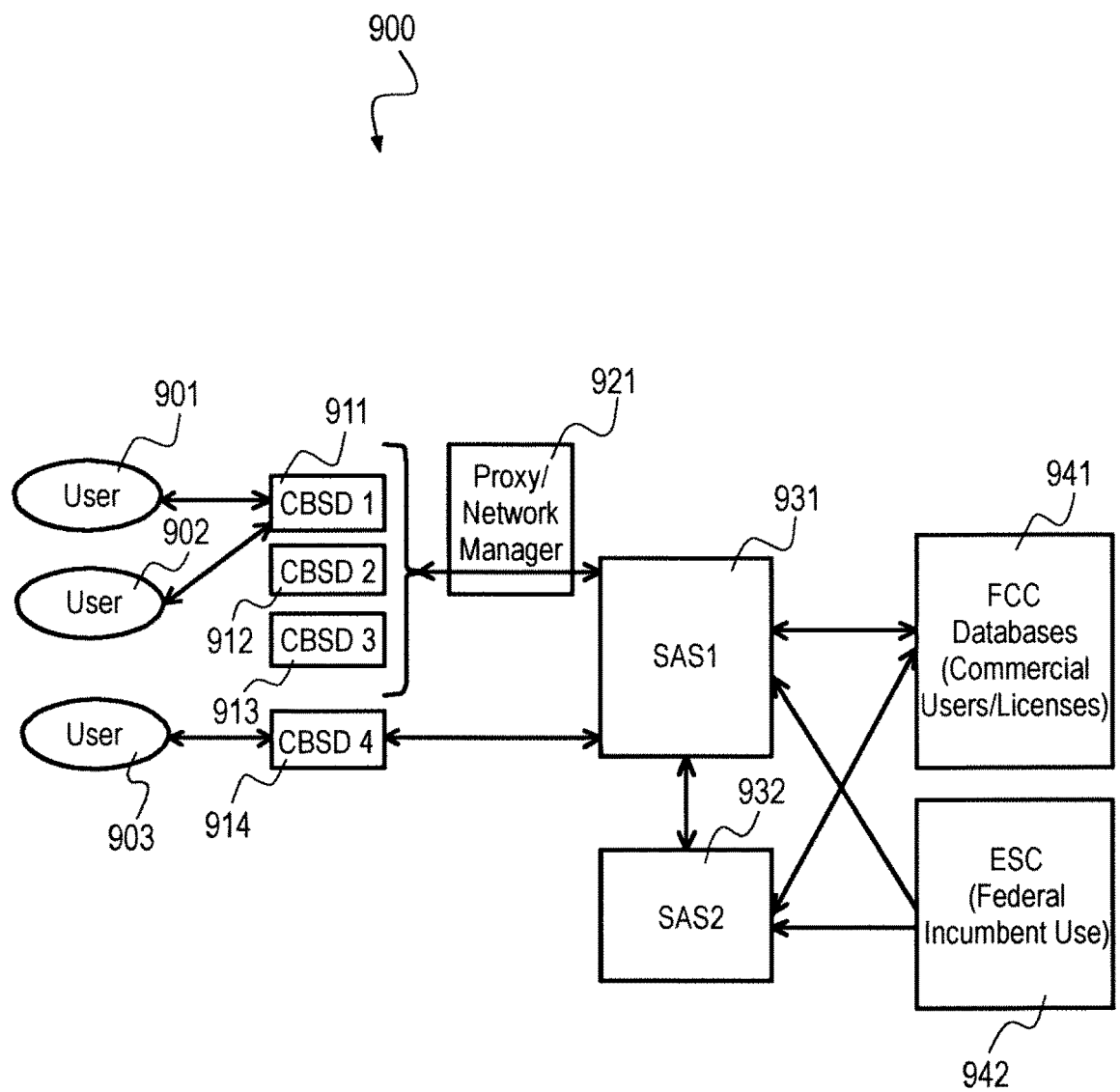
FIG. 9 is a schematic diagram illustrating a spectrum access system (SAS) 900 with two central SAS coordinators 931, 932 for coordinating spectrum use between incumbents, PA (priority access) users and GAA (general authorized access) users according to FCC (Federal Communications Commission) standardization.

The FCC also mandates a Spectrum Access System (SAS) that will coordinate the spectrum use between the incumbents, PA and GAA. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices. In fact, FCC mandates most of this information to be contained in the SAS. FCC's Report and Order outlines a sample system with SAS(s) as shown in FIG. 9. If there are multiple SASs, they are supposed to be synchronized with each other. However, the FCC does not specify details of how the SAS have to be implemented and what information has to be synchronized.

Figure 8:
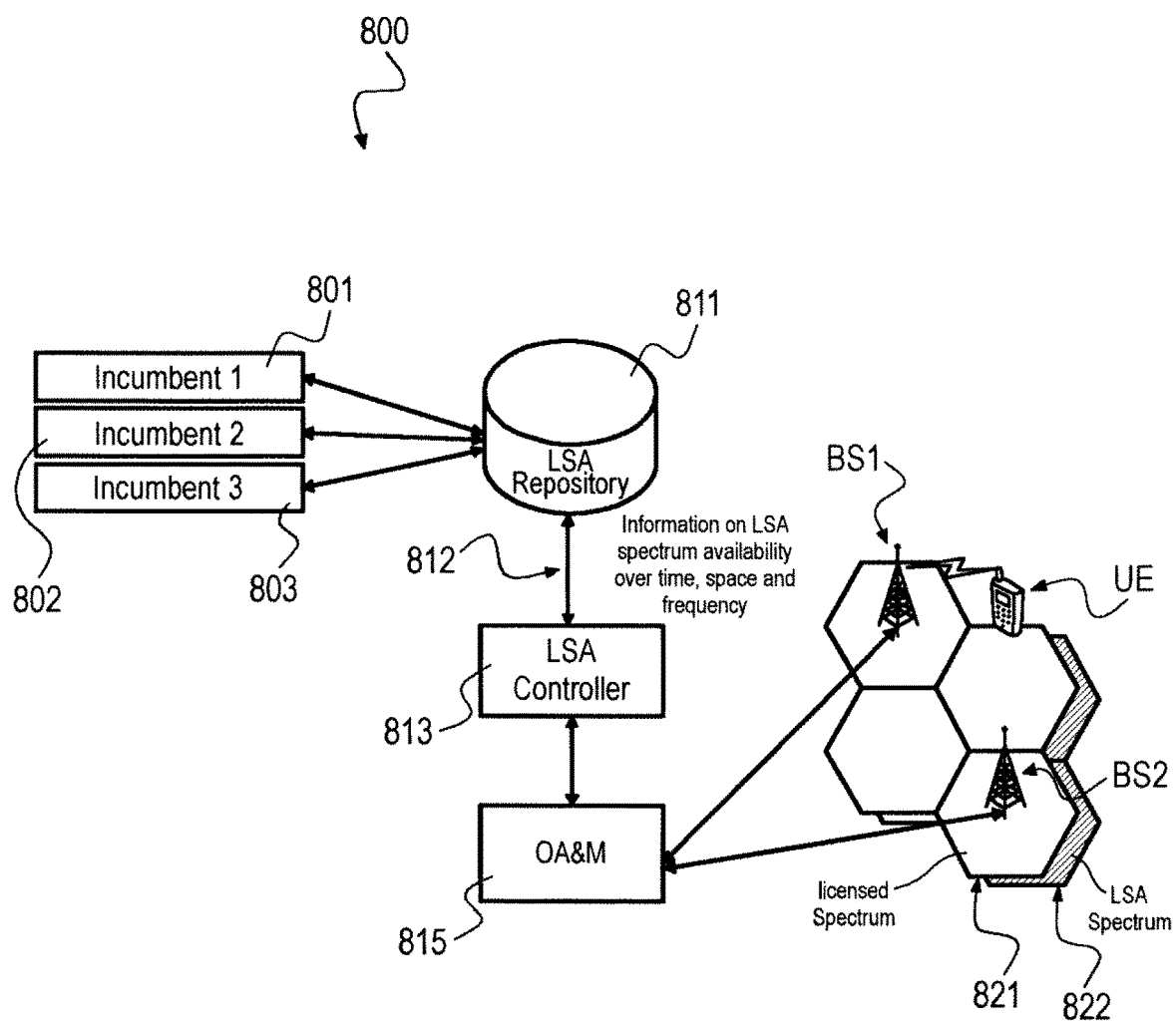
FIG. 8 is a schematic diagram illustrating a license shared access (LSA) communication system 800 including an LSA controller 813 for adapting spectrum usage.

The methods and devices described hereinafter may be applied in LSA (Licensed Shared Access) systems, ASA (Authorized Shared Access) systems and CSS (Cloud Spectrum Services) systems. The LSA (Licensed Shared Access) concept, e.g. as shown in FIG. 8, was recently developed by RSPG (Radio Spectrum Policy Group) on a European level. The objective is to propose a new way for answering to the operators' needs for more spectrum. It is expected that no more dedicated spectrum will be available for cellular operators for mobile communications in the future. LSA thus proposes mechanisms for introducing shared spectrum based solutions, i.e. mobile cellular operators will have access to additional licensed spectrum from other licensees (like public safety, government. etc.) which they normally would not get access to. LSA is based on a similar solution as ASA (Authorized Shared Access). ASA, however, is limited to IMT spectrum while LSA is also addressing non-IMT bands. Both exist on a rather conceptual level for the time being.

A related technology is CSS (Cloud Spectrum Services) which addresses the same framework as LSA and ASA, but introduces more detailed implementation solutions. On a regulatory level, there is massive interest for LSA/ASA/CSS, in particular in Europe. CEPT WG FM has agreed to launch a corresponding project team. ETSI RRS has finalized the set-up of a so-called SRDoc (System Reference Document) which targets in particular the 2.3-2.4 GHz Band which is expected to be one of the most straightforward candidates for shared spectrum usage. This is also acknowledged by CEPT WG FM. CEPT has taken the inputs into account in its CEPT WG FM project teams PT52 and PT53. While current activities focus on the 2.3-2.4 GHz band in Europe, it should be noted that the usage of the LSA concept is not limited to any specific frequency band. In fact, it is expected that the 2.3-2.4 GHz represents a first exercise and in the future LSA usage will be extended to other bands.

The methods and devices described hereinafter may be applied in WiFi and Bluetooth systems or any near field communication (NFC) technology. WiFi is a local area wireless computer networking technology that allows electronic devices to connect to the network, mainly using the 2.4 gigahertz (12 cm) UHF and 5 gigahertz (6 cm) SHF ISM radio bands. The Wi-Fi Alliance defines Wi-Fi as any "wireless local area network" (WLAN) product based on the IEEE 802.11 standards. However, the term "Wi-Fi" is used in general English as a synonym for WLAN since most modern WLANs are based on these standards. Many devices can use WiFi, e.g. personal computers, video-game consoles, smartphones, digital cameras, tablet computers and digital audio players. These can connect to a network resource such as the Internet via a wireless network access point. Such an access point (or hotspot) has a range of about 20 meters indoors and a greater range outdoors.

Bluetooth is a wireless technology standard for exchanging data over short distances (using short-wavelength UHF radio waves in the ISM band from 2.4 to 2.485 GHz) from fixed and mobile devices, and building personal area networks (PANS). It can connect several devices, overcoming problems of synchronization.

Figure 2:
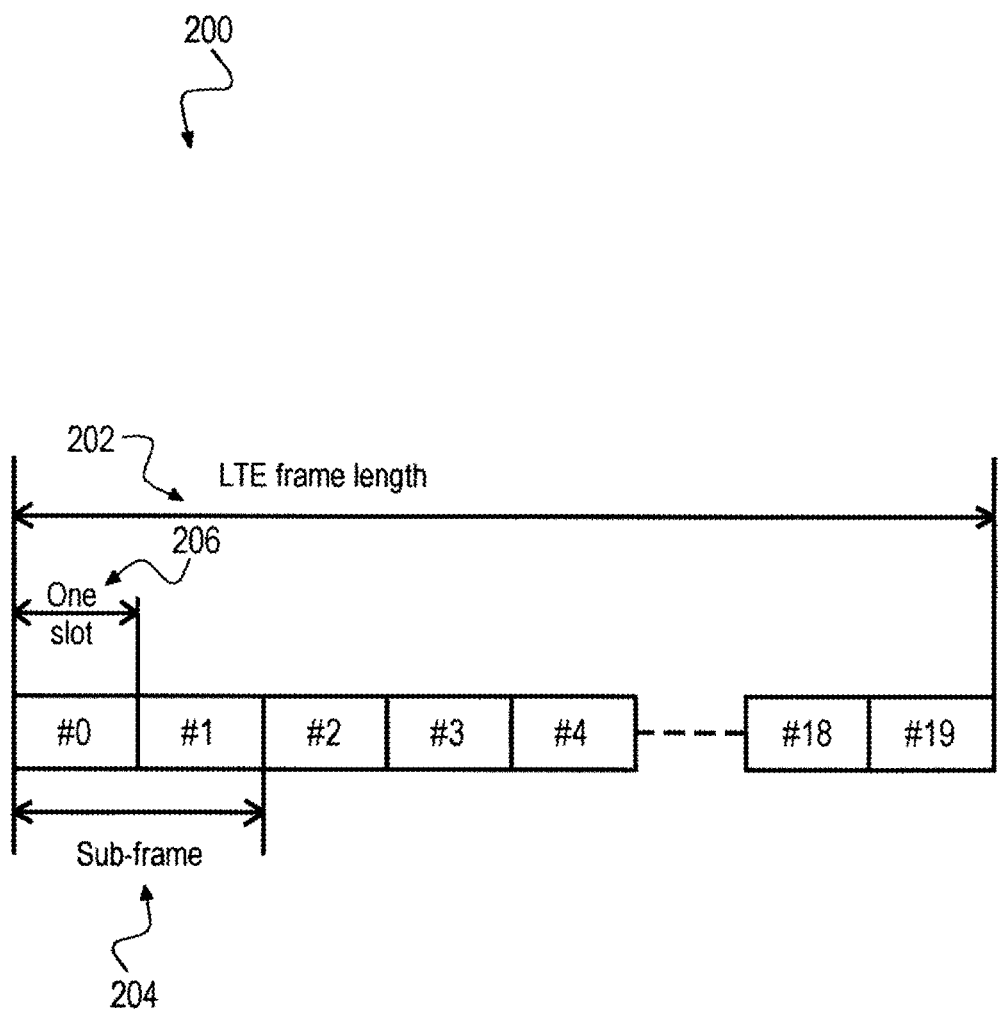
FIG. 2 is a schematic diagram illustrating a type 1 LTE frame structure to be used for LTE FDD (frequency division duplex) mode systems.

The methods and devices described hereinafter may be applied in LTE FDD mode systems, e.g. LTE mode systems having a type 1 LTE frame structure as shown in FIG. 2. The type 1 LTE frame 200 includes 10 sub-frames 204 each having two slots 206. A basic type 1 LTE frame has an overall length of 10 milliseconds.

Figure 3:
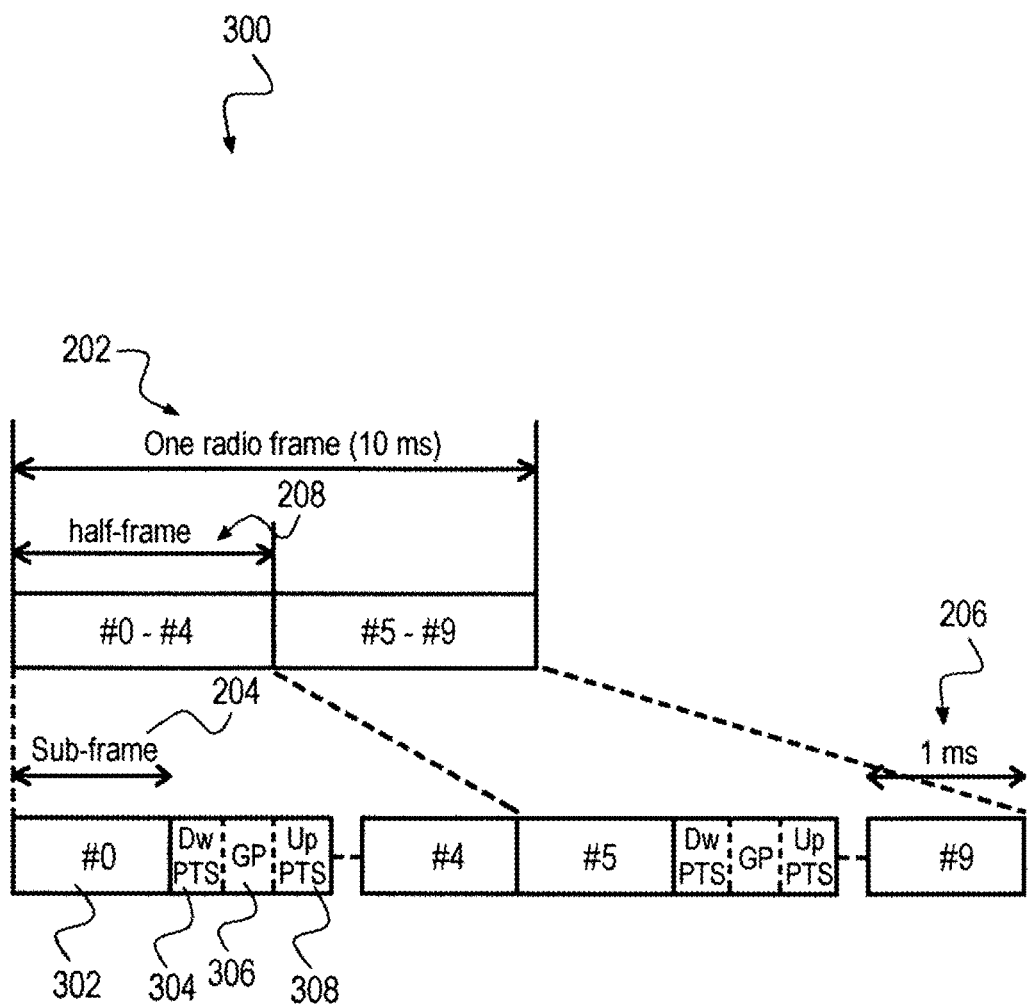
FIG. 3 is schematic diagram illustrating a type 2 LTE frame structure to be used for LTE TDD (time division duplex) mode systems.

The methods and devices described hereinafter may be applied in LTE TDD mode systems, e.g. LTE mode systems having a type 2 LTE frame structure as shown in FIG. 3. The type 2 LTE frame 300 has an overall length 202 of 10 milliseconds. The 10 ms frame 300 comprises two half frames 208, each 5 ms long. The LTE half-frames 208 are further split into five subframes 204, each 1 millisecond long 206. The subframes 204 may be divided into standard subframes 302 and special subframes. The special subframes consist of three fields: DwPTS—Downlink Pilot Time Slot 304; GP—Guard Period 306; and UpPTS—Uplink Pilot Time Stot 308. These three fields are individually configurable in terms of length, although the total length of all three together must be 1 ms.

One of the advantages of using LTE TDD is that to apply a dynamically changing of the up and downlink balance and characteristics to meet the load conditions. In order to achieve this in an ordered fashion, a number of standard configurations have been set within the LTE standards. A total of seven up/downlink configurations have been set, and these use either 5 ms or 10 ms switch periodicities. In the case of the 5 ms switch point periodicity, a special subframe exists in both half frames. In the case of the 10 ms periodicity, the special subframe exists in the first half frame only. The subframes 0 and 5 as well as DwPTS are always reserved for the downlink. UpPTS and the subframe immediately following the special subframe are always reserved for the uplink transmission.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

Figure 4:
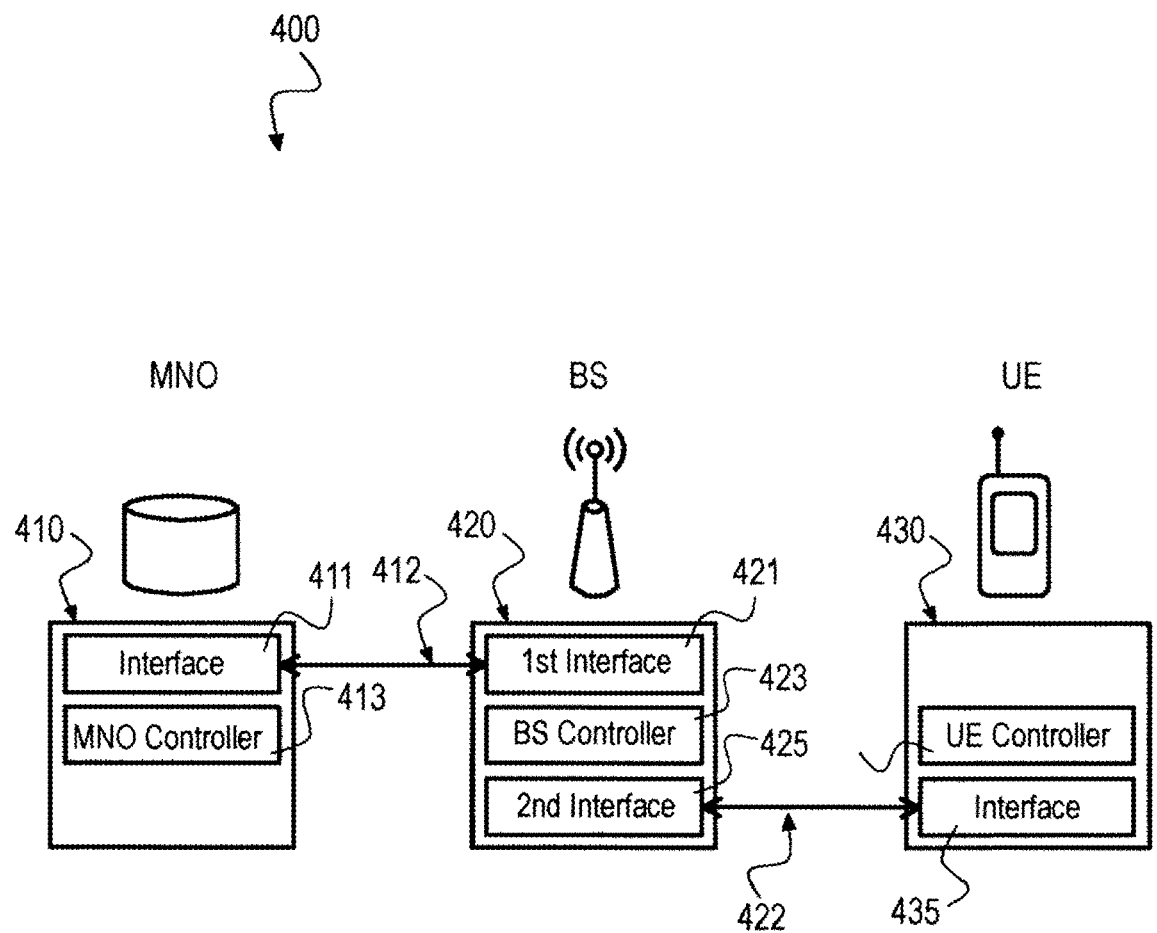
FIG. 4 is a schematic diagram of a mobile communication system 400 including a mobile network operator (MNO) network 410, a base station (BS) circuitry 420 and a user equipment (UE) 430.

FIG. 4 is a schematic diagram of a mobile communication system 400 including a mobile network operator (MNO) network 410, a base station (BS) circuitry 420 and a user equipment (UE) 430.

The BS circuitry 420 is configured to adapt operation of a UE 430 between a stand-alone operation mode and a mobile network operator (MNO) assisted operation mode. The BS circuitry 420 includes a first interface 421 connectable 412 to the MNO network 410, a second interface 425 connectable 422 to the UE 430; and a BS controller 423. The BSS controller 423 is configured to transmit a first register message, e.g. a register message 2a as described below with respect to FIG. 6, via the first interface 421 to the MNO network 410. The first register message indicates a request to operate the UE 430 in at least one licensed frequency band of the MNO network 410. The BS controller 423 is further configured to signal a hand-over, e.g. a hand-over message 3c as described below with respect to FIG. 6, via the second interface 425 to the UE 430. The hand-over indicates a transition from operating the UE 430 in at least one unlicensed frequency band of the stand-alone operation mode to operating the UE 430 in the at least one licensed frequency band of the MNO assisted operation mode.

The request to operate the UE 430 in an MNO assisted operation mode may be autonomously generated by the base station circuitry 420 or may be received from the MNO network 410, e.g. by the message 3a as described below with respect to FIG. 6. Alternatively, the request to operate the UE 430 in an MNO assisted operation mode may be decided by the UE 430 and signaled to the BS circuitry 420, e.g. by the message 3b as described below with respect to FIG. 6.

The BS controller 423 may transmit information via the second interface 425 to the UE 430 which indicates a list of available links for connecting the UE 430, e.g. by the message 2b as described below with respect to FIG. 6. The list of available links may include for example: a link through the MNO network 410 based on licensed access technology, a link through an MNO-independent network based on WiFi, a link through the MNO-independent network based on Bluetooth, a link through the MNO-independent network based on stand-alone license-assisted access (LAA), and a link through the MNO-independent network based on another access technology.

The BS controller 423 may adapt an access technology for accessing the UE 430 based on 3GPP long term evolution (LTE) in a dedicated licensed band, for example corresponding to LTE licensed 501 as described below with respect to FIG. 5. The BS controller 420 may adapt an access technology for accessing the UE 430 based on 3GPP LAA in a combination of a dedicated licensed band and an unlicensed band, for example corresponding to LTE LAA licensed/unlicensed 503 as described below with respect to FIG. 5. The BS controller 423 may adapt an access technology for accessing the UE 430 based on stand-alone LTE LAA in an unlicensed band, for example corresponding to stand-alone LTE LAA 504, e.g. LTE being operated on an unlicensed, license-by-rule or shared basis as described below with respect to FIG. 5. The BS controller 423 may adapt an access technology for accessing the UE 430 based on Spectrum Access System (SAS) in a dedicated licensed band for incumbent usage, for example corresponding to the SAS system described below with respect to FIG. 9. The BS controller 423 may adapt an access technology for accessing the UE 430 based on SAS LAA in a combination of a dedicated licensed band for incumbent usage and an unlicensed band, for example corresponding to the SAS system described below with respect to FIG. 9.

The BS controller 423 may adapt an access technology for accessing the UE 430 based on LSA LAA in a combination of a dedicated licensed band for incumbent usage and an unlicensed band, for example corresponding to the LSA system described below with respect to FIG. 8. The BS controller 423 may adapt an access technology for accessing the UE 430 based on LSA LAA, ASA LAA, and/or CSS LAA, for example in a combination of a dedicated licensed band for incumbent usage and an unlicensed band. The BS controller 423 may adapt an access technology for accessing the UE 430 based on any combination of LTE, SAS, LSA, ASA and CSS LAA.

Figure 6:
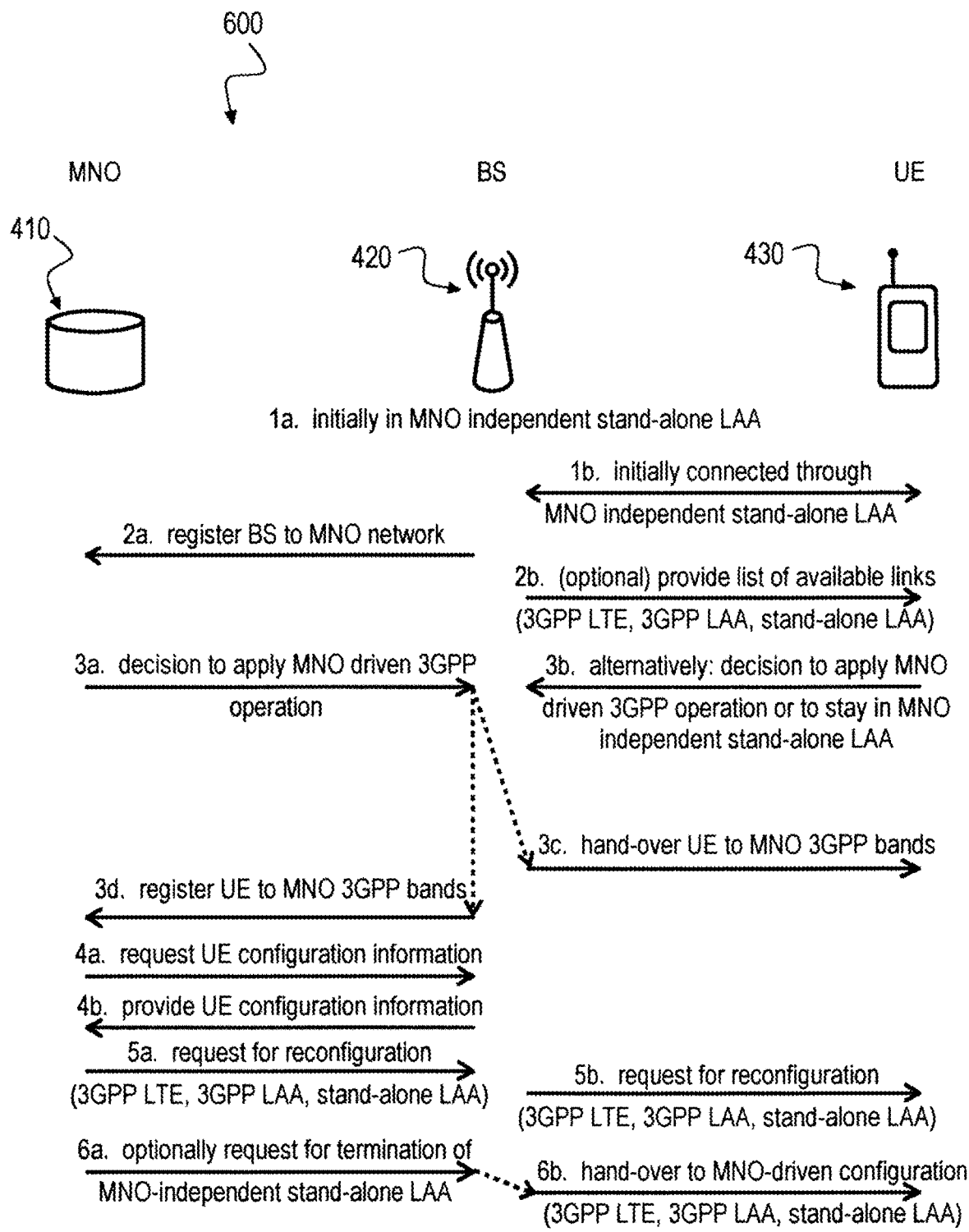
FIG. 6 is a schematic diagram illustrating a message sequence between a BS circuitry 420, a MNO network 410 and a UE 430 for switching an operation mode of the UE from stand-alone LAA to MNO assisted operation.

The BS controller 423 may terminate the operation of the UE 430 in the stand-alone operation mode if the MNO network 410 provides at least one unlicensed frequency band for operating the UE, e.g. when a request for termination of MNO-independent stand-alone LAA is received from the MNO network 410, e.g. as illustrated by the message 6a in FIG. 6. The BS controller 423 may initiate the operation of the UE 430 in the stand-alone operation mode if the MNO network 410 stops providing the at least one unlicensed frequency band or stops operation in unlicensed band, e.g. as illustrated by the message 1 in FIG. 7.

The UE 430 is operable in a stand-alone operation mode and a mobile network operator (MNO) assisted operation mode. The UE 430 includes an interface 435 connectable 422 to the BS circuitry 420 and a UE controller 433. The UE 430 is configured to receive a hand-over signal from the base station circuitry 420, e.g. a hand-over message 3c as described below with respect to FIG. 6. The hand-over signal indicates a transition from an operation of the UE 410 in at least one unlicensed frequency band of the stand-alone operation mode to an operation of the UE 410 in at least one licensed frequency band of the MNO assisted operation mode. The UE controller 433 is configured to initiate a transition from operating the UE 430 in the stand-alone operation mode to operating the UE 430 in the MNO assisted operation mode based on the hand-over signal.

Figure 7:
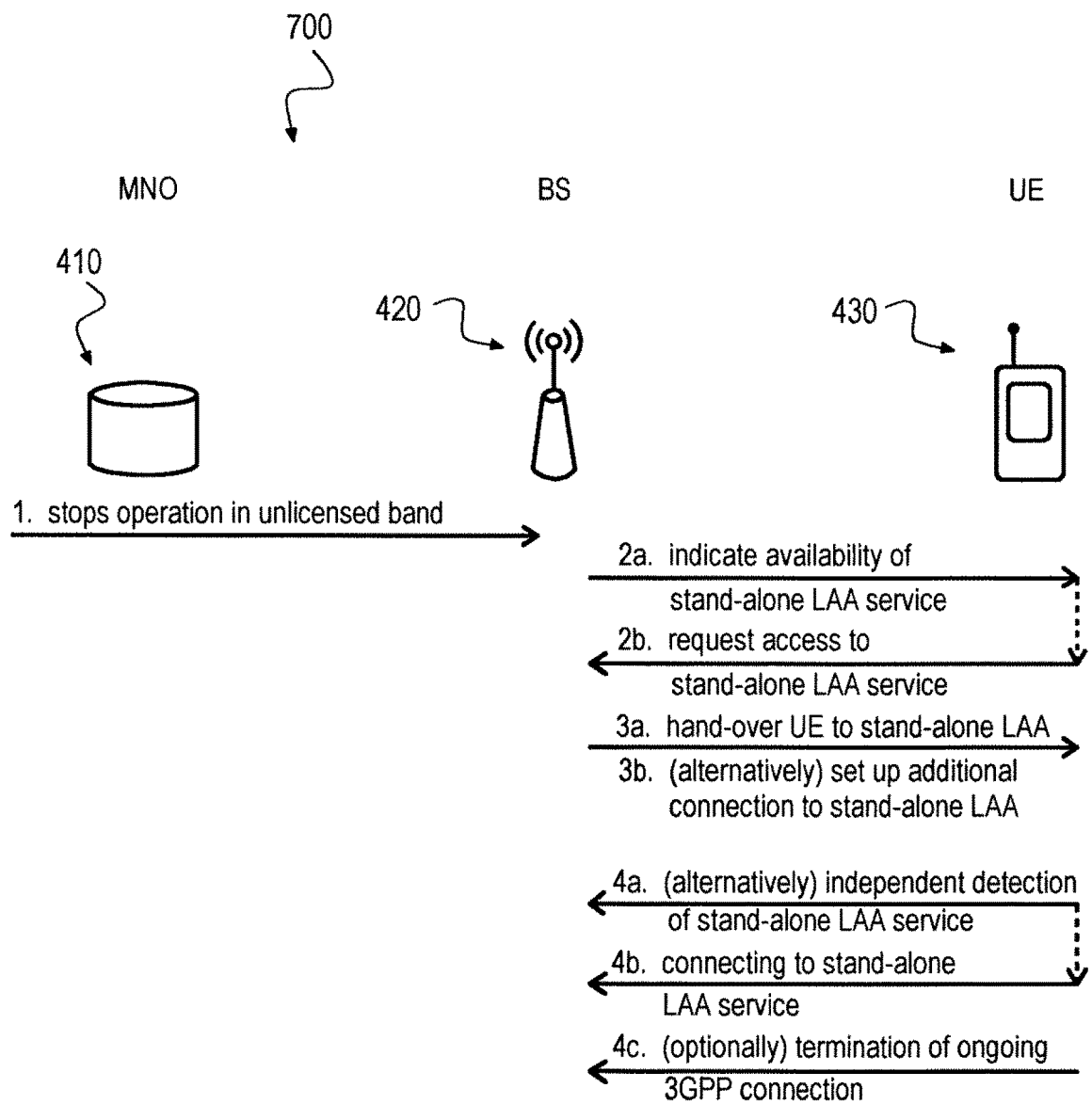
FIG. 7 is a schematic diagram illustrating a message sequence between a BS circuitry 420, a MNO network 410 and a UE 430 for switching an operation mode of the UE from MNO assisted operation to stand-alone LAA.

The UE controller 433 may initiate a transition from operating the UE 430 in the MNO assisted operation mode to operating the UE 430 in the stand-alone operation mode based on a signal from the base station circuitry 420 indicating a termination of the MNO assisted operation mode, e.g. a message 1 indicating a stop of operation in unlicensed bands as illustrated in FIG. 7. The UE controller 433 may detect an MNO-independent network for operating the UE 430 in the stand-alone operation mode after reception of the signal indicating the termination of the MNO assisted operation mode and may connect the UE 430 to the MNO-independent network.

The mobile communication system 400 described above allows to dynamically switch between 3GPP LAA (joint operation of dedicated licensed & unlicensed bands based on LTE) and Stand-alone LAA (LTE only used in unlicensed band(s) without additional dedicated licensed carrier), in particular a dynamic switch between a) joint operation of dedicated licensed LTE and LTE in unlicensed bands (3GPP LTE) and b) LTE in unlicensed bands only (stand-alone LAA). The mobile communication system 400 further allows to efficiently manage coexistence between legacy unlicensed systems, in particular WiFi in 5 GHz, and Stand-alone LAA, i.e. to optimize resource efficiency in unlicensed band through centralized allocation strategy of LTE access (coexistence with other ISM systems such as WiFi).

The mobile communication system 400 described above allows dynamic addition/removal of (operator independent) stand-alone LAA in addition to 3GPP LTE (dedicated licensed band), 3GPP LAA (dedicated licensed band plus unlicensed band usage), WiFi, etc. The mobile communication system 400 described above introduces a novel resource management scheme using a centralized resource allocation for stand-alone LAA while contention based access is still maintained for coexistence with WiFi (and any other contention based access system).

In one implementation of the BS circuitry of the mobile communication system 400, the hand-over indicates a transition from operating the UE 430 in at least one frequency band of the stand-alone operation mode to operating the UE 430 in the at least one licensed frequency band of the MNO assisted operation mode. The at least one frequency band of the stand-alone operation mode may be one of an unlicensed frequency band as described above, a license-by-rule frequency band, a shared frequency band, a TV White Space (TVWS) frequency band or any other suitable type of frequency. TV White Spaces (TVWS) are frequencies made available for unlicensed use at locations where the spectrum is not being used by licensed services, such as television broadcasting. This spectrum may be located in the VHF and UHF bands. The BS controller may be configured to signal an inverse hand-over via the second interface to the UE, wherein the inverse hand-over indicates a retransition from operating the UE in the at least one licensed frequency band of the MNO assisted operation mode to operating the UE in the stand-alone operation mode.

In one implementation of the UE of the mobile communication system 400, the hand-over signal indicates a transition from an operation of the UE in at least one frequency band of the stand-alone operation mode to an operation of the UE in at least one licensed frequency band of the MNO assisted operation mode. The at least one frequency band of the stand-alone operation mode may be one of an unlicensed frequency band, a license-by-rule frequency band, a shared frequency band, a TV White Space (TVWS) frequency band or any other suitable type of frequency. The UE controller may be configured to initiate a retransition from operating the UE in the at least one licensed frequency band of the MNO assisted operation mode to operating the UE in the stand-alone operation mode when receiving an inverse hand-over signal from the BS circuitry via the interface.

In one implementation of the UE of the mobile communication system 400, the UE is operable in a stand-alone operation mode and a mobile network operator (MNO) assisted operation mode and the UE includes: an interface connectable to a base station (BS) circuitry, in particular a base station circuitry as described above; and a UE controller, configured to initiate a transition from operating the UE in at least one frequency band of the stand-alone operation mode to an operation of the UE in at least one licensed frequency band of the MNO assisted operation mode, wherein the UE controller is configured to connect the interface to the BS circuitry when operating the UE in the at least one licensed frequency band of the MNO assisted operation mode. The at least one frequency band of the stand-alone operation mode may be one of an unlicensed frequency band, a license-by-rule frequency band, a shared frequency band, a TV White Space (TVWS) frequency band or any other suitable type of frequency. The UE controller may be configured to initiate a retransition from operating the UE in the at least one licensed frequency band of the MNO assisted operation mode to operating the UE in the stand-alone operation mode.

Figure 5:
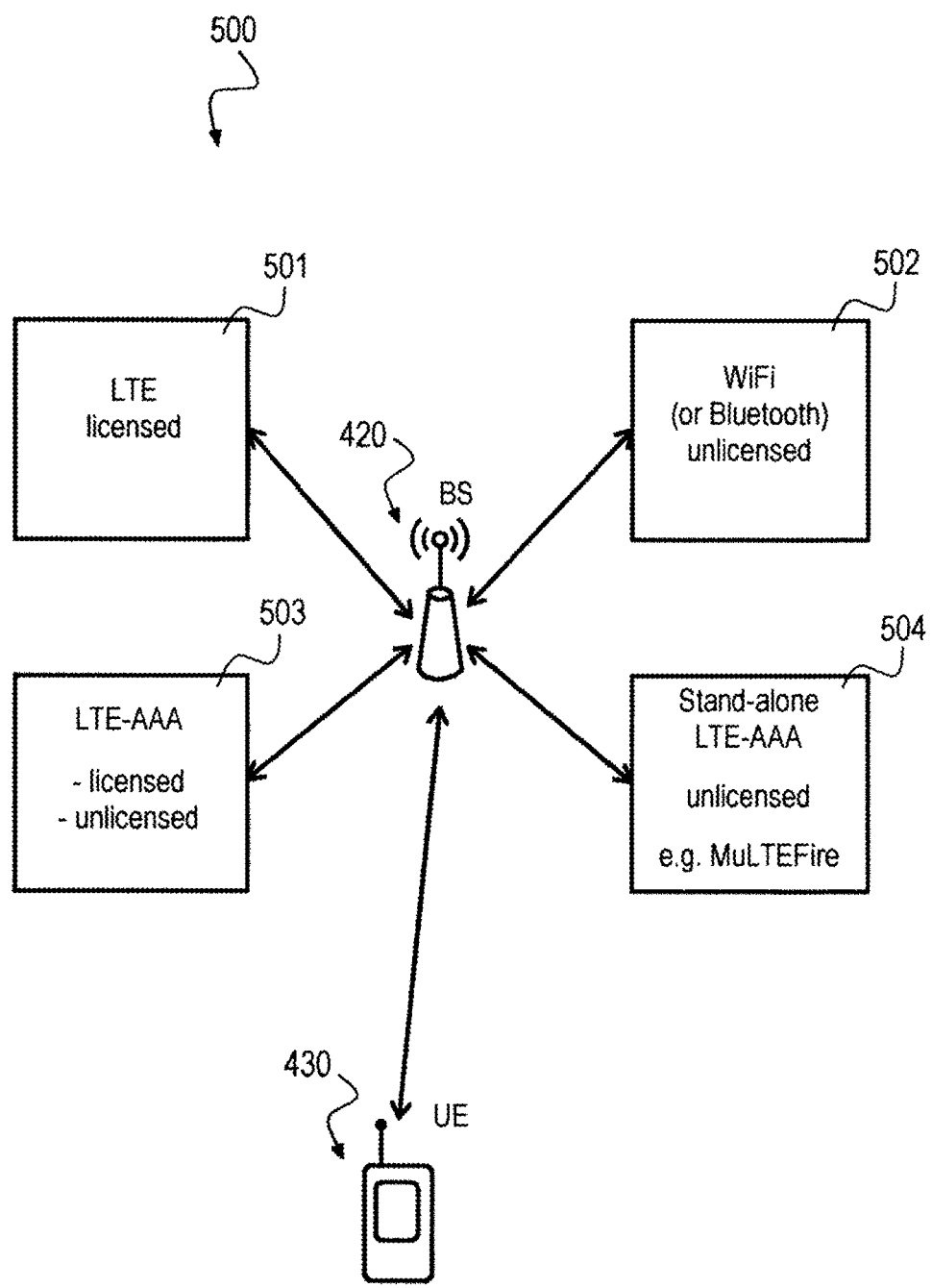
FIG. 5 is a schematic diagram 500 illustrating different operations modes that a base station circuitry 420 can use for adapting a user equipment 430.

FIG. 5 is a schematic diagram 500 illustrating different operations modes that a base station circuitry 420 can use for adapting a user equipment 430.

The BS 420, in particular the BS controller 423 may adapt an access technology for accessing the UE 430 based on 3GPP long term evolution (LTE) in a dedicated licensed band 501 or based on 3GPP LAA in a combination of a dedicated licensed band and an unlicensed band 503 or based on stand-alone LTE LAA in an unlicensed band 504 or based on a near field communication LAA such as WiFi or Bluetooth 502 or based on a Spectrum Access System (SAS) in a dedicated licensed band for incumbent usage. The BS 420 may further adapt the access technology based on SAS LAA, LSA LAA, ASA LAA or CSS LAA or any combination thereof.

FIG. 6 is a schematic diagram illustrating a message sequence between a BS circuitry 420, a MNO network 410 and a UE 430 for switching an operation mode of the UE from stand-alone LAA to MNO assisted operation, e.g. according to a dynamic Switch between 3GPP LAA and stand-alone LAA.

A stand-alone LAA mode, such as LTE being operated on an unlicensed, license-by-rule or shared basis, etc. does not require MNO support (although it can also be provided by an MNO, this represents a special case. Typically, a given Small Cell would prefer to only operate one system in a given unlicensed band (such as 5 GHz ISM band which is the target for LAA and stand-alone LAA)—it does not make sense to operate two systems in an unlicensed band in parallel which compete against each other through an (inefficient) contention based protocol.

In case that a given Small Cell, in FIG. 6 denoted as base station (BS), intends to initiate an MNO driven operator, in FIG. 6 denoted as mobile network operator (MNO), for example upon request by a given operator, the following steps may be performed:

The target Small Cell/BS is assumed to initially operate stand-alone LAA (1a). User Devices, also denoted as user equipments (UEs) 340 are connected (1b) to the target Small Cell/BS 420 through stand-alone LAA. There may be a decision or request by a concerned MNO 410 to apply a MNO driven 3GPP operation (3a). The target Small Cell/BS 420 registers (2a) to the MNO network 410 and starts providing the service to User Devices 430. Depending on the decision of the Small Cell/BS 420 or decision imposed by the concerned MNO 410, the User Devices 430 attached to the target Small Cell/BS 420 are immediately hand-off'ed (3c) to the MNO 3GPP bands and registered (3d) to the 3GPP MNO network or they are allowed to maintain the stand-alone connection (i.e., they are not registered to the MNO network 410). Optionally, the target Small Cell/BS 420 can provide the list of available links (2b), i.e., link through MNO network 410, independent network based on WiFi or stand-alone LAA or any other (typically contention based) access technology, to the various User Devices 430. Then, the target user devices 430 may perform a decision on their own whether they prefer to be connected to the MNO network 410, for example dedicated licensed, LAA or stand-alone LAA, or to an MNO-independent stand-alone LAA mode.

The MNO 410 may request configuration information (4a) from the target Small Cell/BS 420. This information may be provided by the target Small Cell/BS 420. The MNO 410 may choose to operate 3GPP LTE in a dedicated licensed band, to use 3GPP LAA by combining operation in a dedicated licensed band and an unlicensed band or the MNO 410 may choose to employ a stand-alone LAA mode only. The MNO 410 provides the request for reconfiguration (5a) to the target Small Cell/BS 420 and enforces a corresponding reconfiguration (5b). Optionally, the decision for the best configuration can be taken locally by the concerned Small Cell/BS 420.

In case that the MNO 410 decides to operate at least partly in the unlicensed band, either through LAA or stand-alone LAA, then the target Small Cell/BS 420 may consider whether it still makes sense to operate a stand-alone LAA mode independent of any MNO 410. Also, the target Small Cell/BS 420 may be forced by the concerned MNO 410 to terminate any MNO-independent stand-alone LAA connection (6a). In particular if the MNO LAA would access the same frequency band as the stand-alone LAA, it would make sense to terminate the stand-alone LAA—operating both systems independently would lead to an inefficient usage of the spectrum resource due to an inefficient contention based access protocol between two (probably not collaborating) systems. Before terminating the stand-alone (MNO-independent) operation of LAA, the target Small Cell/BS 420 may enforce a Handover (H/O) (6b) in to the MNO-driven 3GPP configuration (dedicated licensed spectrum only, LAA or stand-alone LAA).

FIG. 7 is a schematic diagram illustrating a message sequence between a BS circuitry 420, a MNO network 410 and a UE 430 for switching an operation mode of the UE from MNO assisted operation to stand-alone LAA.

In case that the MNO driven operator, in FIG. 7 denoted as mobile network operator (MNO) 410, stops operation in the licensed band, the Small Cell, in FIG. 7 denoted as base station (BS) 420 may be informed and the following steps may be performed:

As soon as the MNO 410 stops its operation within the unlicensed band (1), e.g., by stopping its dedicated licensed/LAA service or by switching from LAA to dedicated licensed spectrum only or by terminating its stand-alone LAA service, the target Small Cell/BS 420 may provide an MNO-independent provision of stand-alone LAA. This can be provided as an alternative access mechanism even if the MNO 410 still maintains other services, such as a dedicated licensed band operation only for example. As soon as the stand-alone LAA service is operational, the next steps may be as follows: The target Small Cell/BS 420 enforces a H/O (3a) or the set-up (3b) of an (e.g. additional) connection to the stand-alone LAA service. The target Small Cell/BS 420 may provide information (2a) to the User Devices 430 on the availability of a stand-alone LAA service and it is up to the User Devices 430 to request access to it (2b) or to initiate directly the connection set-up procedure. The target Small Cell/BS may be configured to not provide any information on the newly available stand-alone LAA service to the User Devices 430 and the User Devices 430 may need to independently detect (4a) the presence of the stand-alone (MNO-independent) LAA mode. The User Devices 430 may choose to initiate/request a connection (4b)—and optionally a termination of an ongoing 3GPP connection (4c).

FIG. 8 is a schematic diagram illustrating a license shared access (LSA) communication system 800 including an LSA controller 813 for adapting spectrum usage. The license shared access (LSA) communication system 800 includes a LSA repository 811, an LSA controller 813, an OA&M entity, an exemplary number of three incumbents 801, 802, 803 and a public mobile communication system having an exemplary number of two base stations BS1, BS2 and one exemplary user equipment UE connected to base station BS1. The public mobile communication system provides a licensed spectrum 821 and an LSA spectrum 822.

The LSA repository 811 may store information on LSA spectrum availability over time, space and frequency. The LSA controller 813 may be used for controlling access to the LSA system. The OA&M entity 815 may be used for maintaining operation of the LSA system.

Each of the two base stations BS1, BS2 may include a BS circuitry 420 as described above with respect to FIGS. 4 to 7. For adapting operation of the UE between stand-alone operation mode and a mobile network operator (MNO) assisted operation mode, in this LSA system 800 also referred to as LSA operator assisted operation mode. In the LSA system 800 depicted in FIG. 8, the LSA Controller 813 may include the functionality of the MNO network 410 as described above with respect to FIGS. 4 to 7. The UE may correspond to the UE 430 as described above with respect to FIGS. 4 to 7.

FIG. 9 is a schematic diagram illustrating a spectrum access system (SAS) 900 with two central SAS coordinators 931, 932 for coordinating spectrum use between incumbents, PA (priority access) users and GAA (general authorized access) users according to FCC (Federal Communications Commission) standardization.

The SAS communication system 900 includes an exemplary number of two SAS entities 931, 932, FCC databases 941 and an ESC (Environmental Sensing Capability) entity 942 which are coupled between each other. An exemplary number of four CBSD (citizens broadband radio service devices) entities 911, 912, 913, 914 are coupled with the SAS1 entity 931, where CBSD1, CBSD2 and CBSD3 are coupled via a proxy network manager 921. The CBSD devices may be coupled to users 901, 902, 903, 904. In the example of FIG. 9 the CBSD1 device is connected to a first user 901 and a second user 902 while CBSD4 device is connected to a third user 903.

The SAS entities 931, 932 have the following functionality: Enact and enforce all policies and procedures developed by the SAS Administrator; Determine and provide to CBSDs the permissible channels or frequencies at their location; Determine and provide to CBSDs the maximum permissible transmission power level at their location; Retain information on, and enforce, Exclusion Zones and Protection Zones; Communicate with the ESC to obtain information about federal Incumbent User transmissions and instruct CBSDs to move to another frequency range or cease transmissions; Ensure that CBSDs operate in geographic areas and within the maximum power levels required to protect federal Incumbent Users from harmful interference; Register and authenticate the identification information and location of the CBSDs; Ensure that CBSDs protect non-federal incumbent users from harmful interference; Protect Priority Accessed Licensees from interference caused by other PALs and from GAA users; Facilitate Coordination between GAA users operating Category B CBSDs; Resolve conflicting uses of the band while maintaining a stable radio frequency environment; Ensure secure and reliable transmission of information between the SASs and the GBSDs.

Each of the CBSD entities 911, 912, 913, 914 may include a BS circuitry 420 as described above with respect to FIGS. 4 to 7 for adapting operation of the UE (user in this system) between stand-alone operation mode and a mobile network operator (MNO) assisted operation mode, in this SAS system 900 also referred to as SAS operator assisted operation mode. In the SAS system 900 depicted in FIG. 9, the proxy network manager 921 or the SAS entity 931, 932 may include the functionality of the MNO network 410 as described above with respect to FIGS. 4 to 7. The users 901, 902, 903 may correspond to the UE 430 as described above with respect to FIGS. 4 to 7.

Figure 10:
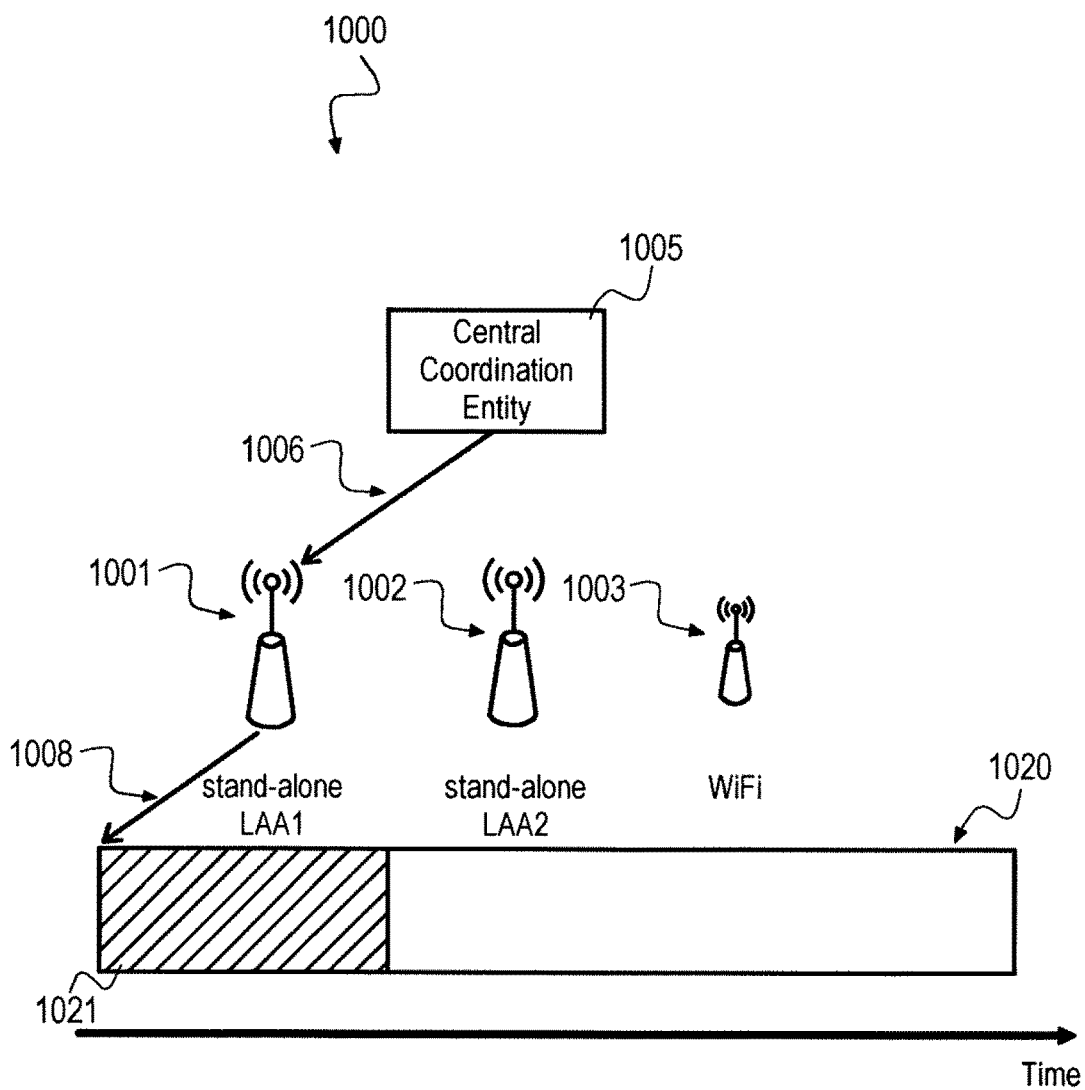
FIG. 10 is a schematic diagram illustrating a first state 1000 of an efficient resource access mechanism in an LAA communication system including a central coordination entity 1005, two base station (BS) circuitries 1001, 1002 and a small cell 1103.
Figure 11:
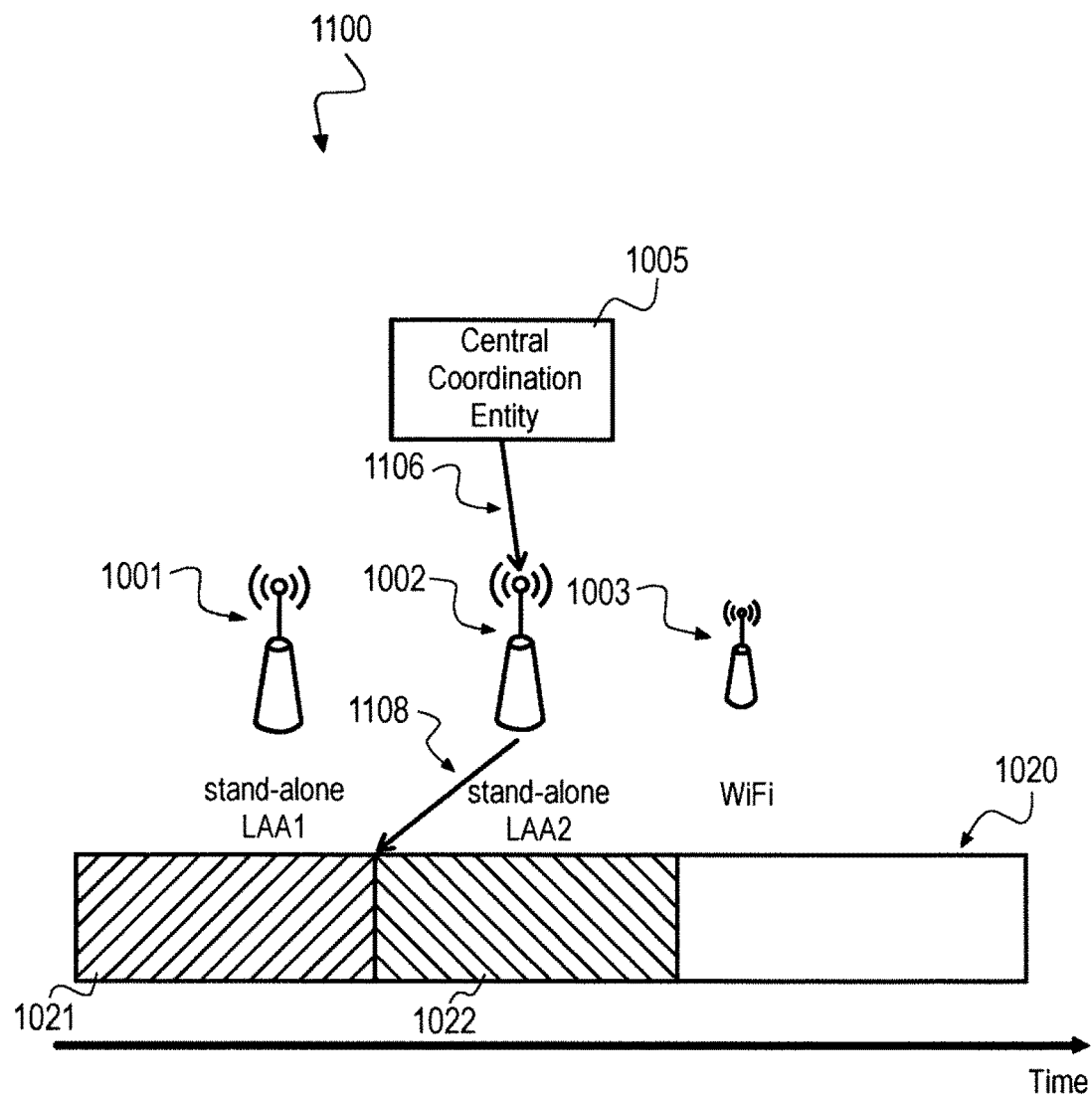
FIG. 11 is a schematic diagram illustrating a second state 1100 of the efficient resource access mechanism in the LAA communication system depicted in FIG. 10.
Figure 12:
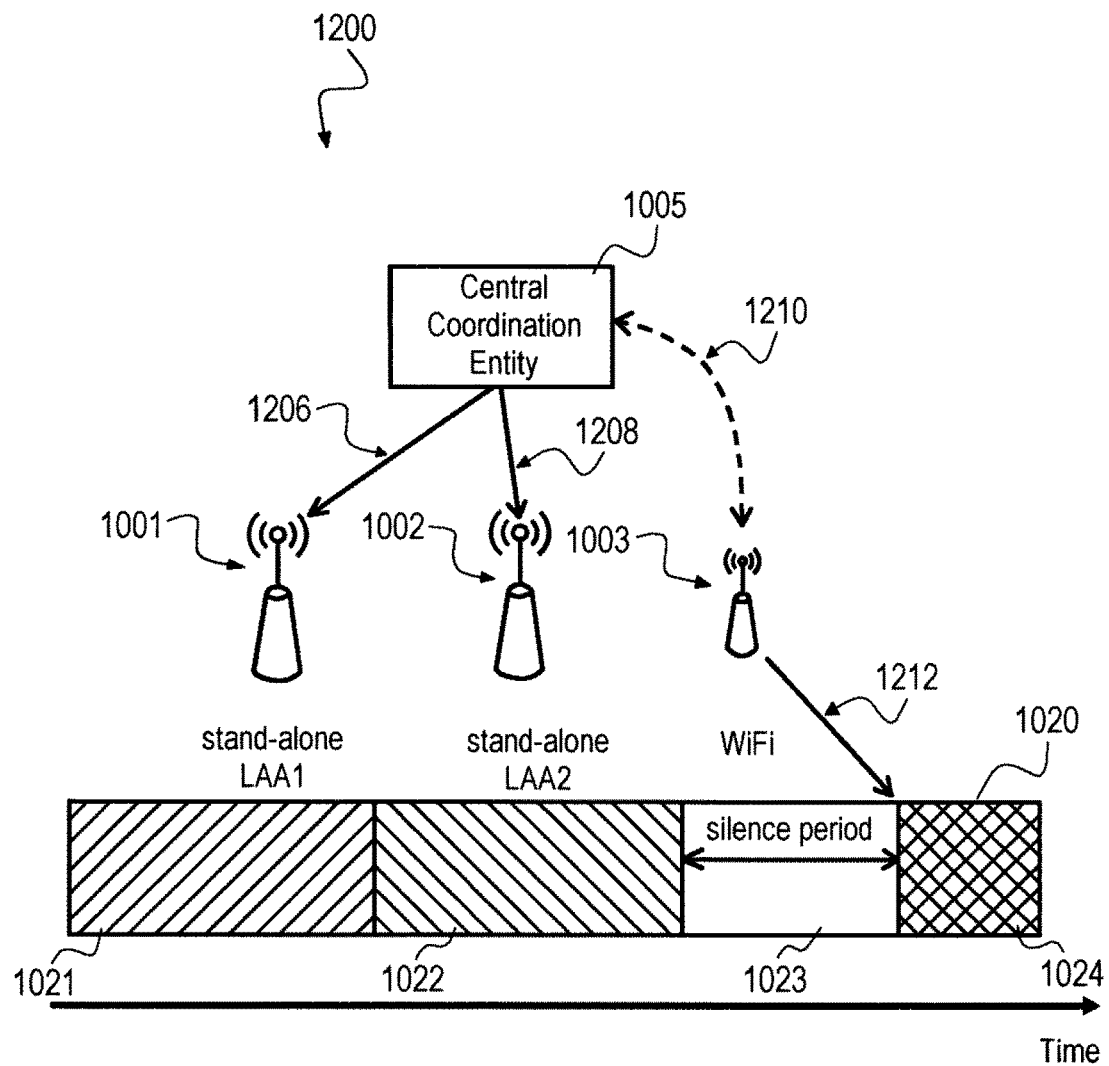
FIG. 12 is a schematic diagram illustrating a third state 1200 of the efficient resource mechanism in the LAA communication system depicted in FIG. 10.
Figure 13A:
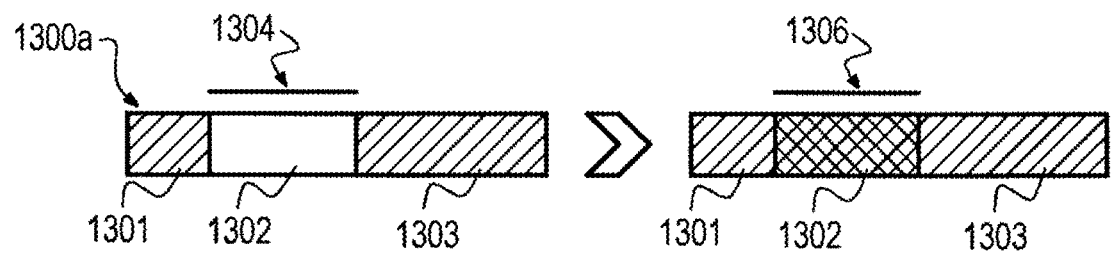
FIGS. 13a, 13b, 13c and 13d are schematic diagrams illustrating transmissions 1300a, 1300b, 1300c and 1300d in which silence periods are filled up with dummy data according to a method for scheduling coordinated access to a radio resource.
Figure 13B:
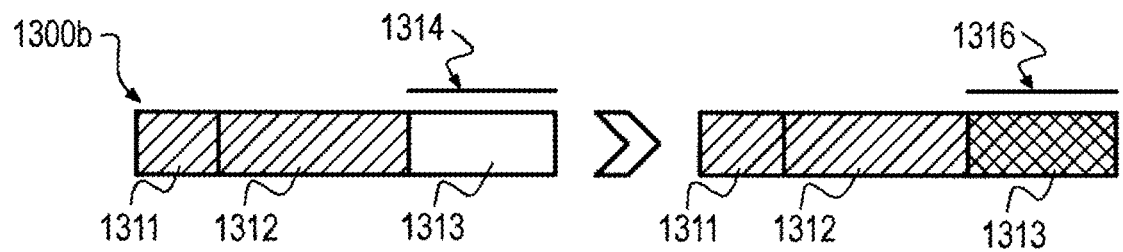
Figure 13C:
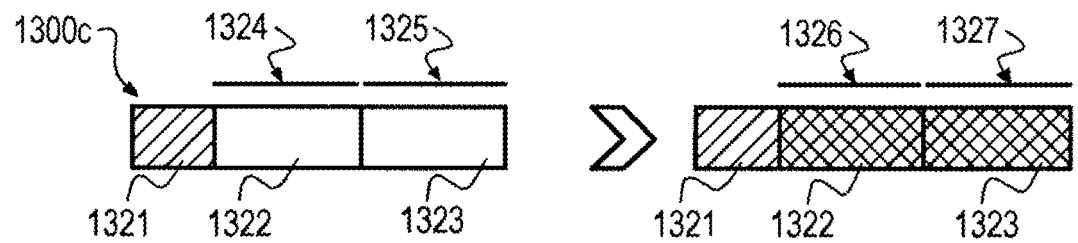
Figure 13D:
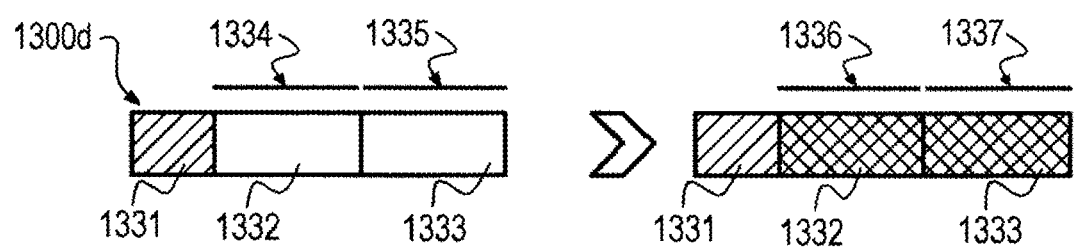

FIGS. 10, 11 and 12 illustrate an efficient resource access mechanism by combination of centralized LTE resource access, e.g. stand-alone LAA) with contention based access, e.g. WiFi, Bluetooth, etc.

Traditionally, coexistence between all systems in the target band of 3GPP LTE LAA, stand-alone LAA (such as LTE being operated on an unlicensed, license-by-rule or shared basis, etc.), WiFi, etc. are based on the CMSA/CA protocol. The basic principles are as follows:

Carrier Sense: before a transmission is executed, the concerned device first listens to the resource (i.e., the target frequency band) in order to find out whether another device in on the air.

Collision Avoidance: In case that another device is detected, wait for a pre-defined period of time prior to another listening operation. This step may lead to a high level of inefficiency, since long waiting times may be enforced while the channel is empty in the immediate future Request to Send/Clear to Send (RTS/CTS): in order to reduce the hidden node problem, first a "Request to Send" is transmitted and only when a "Clear to Send" is received, the actual transmission is started. Note that this protocol is not always implemented, in particular for small packets (the overhead for RTS/CTS is quite large).

The disclosed efficient resource access mechanism as described below with respect to FIGS. 10, 11, 12 guarantees collision-free transmissions without RTS/CTS.

Transmission: in case that the resource (i.e., target frequency band) is identified to be unoccupied (for example through the reception of the CTS message), then the actual data transmission is initiated. The transmitting device waits for an acknowledgement packet indicating that the packet was received and decoded without error. In case that the correct reception cannot be identified, some error event is assumed to have happened (hidden node based interference, etc.), forcing the device to apply a period of binary exponential backoff before the re-transmission can be initiated again.

The disclosed efficient resource access mechanism as described below with respect to FIGS. 10, 11, 12 guarantees that no interference occurs and thus no (inefficient) increase of the waiting time is required.

There is coordination between 3GPP LAA Base Stations/Small Cells or stand-alone LAA Base Stations/Small Cells. This is the typical approach for LTE, where Base Stations/Small Cells are connected through the Backbone network. In case of a full stand-alone solution, several implementations for coordination between Small Cells/BS are presented in the following:

There is a centralized service that can be accessed through internet for coordination. For example, the concerned LAA stand-alone Small Cells/BS are contacting the centralized service (through the cabled network access, dedicated licensed LTE, etc.) and provide parameters such as their geographic location, parameterization (bandwidth, carrier frequency, etc.). The centralized service determines the neighbouring Small Cells/BS and provides the corresponding triggers as indicated in the sequel.

One of the stand-alone LAA Small Cell/BS may be declared to be the coordinating entity. This can be achieved through negotiation by concerned Small Cells/BS with a centralized service that can be accessed through internet for coordination or similar. The designated Small Cell/BS provides the corresponding triggers as indicated in the sequel.

The coordinating entity (in a hierarchical approach, this entity is higher in the hierarchy compared to (other) Base Stations/Small Cells) will allocate resources for stand-alone LAA (LTE being operated on an unlicensed, license-by-rule or shared basis or similar) in such a way that one transmission is following right after the previous one. I.e., Small Cells need to exactly schedule the transmission following the triggers of the coordinating entity. Also User Devices will need to exactly schedule their transmissions following the triggers 1008. These triggers can schedule the transmissions ahead of time such that the entities (Small Cells/BS/UEs) have enough time to do the required (signal) processing and they will be ready immediately when their slot is available. Due to the concatenated transmissions, the contention based WiFi protocol will always detect that the channel is occupied and will not transmit. In case that a RTS sequence of WiFi is received, no answer is sent in order to be sure that there will be no transmission initiated by WiFi.

When WiFi access should be permitted, the central control entity may enforce a pause sequence after a given stand-alone LAA transmission. During this empty period, the WiFi nodes (or other contention based access protocols) detect the availability of the medium. Then, they can start their transmissions.

The transition from the transmissions of WiFi nodes (or other contention based access protocols) is then taken over again after a predetermined period of time and when the WiFi transmissions are terminated. This can typically be achieved through application of a contention based protocol similar to the one of WiFi (or other contention based access protocols). Once, the channel access is achieved a similar method as the one detailed above is applied.

The basic principles are illustrated in FIGS. 10, 11, 12.

A base station circuitry, e.g. implemented in one of the base stations 1001, 1002 includes a first interface, e.g. a first interface 421 as described above with respect to FIGS. 4 to 7, a second interface, e.g. a second interface 425 as described above with respect to FIGS. 4 to 7, and a BS controller, e.g. a BS controller 423 as described above with respect to FIGS. 4 to 7.

The first interface 421 is connectable to a network and configured to receive a trigger signal 1006 from a central coordination entity 1005. The trigger signal 1006 indicates a coordinated access of at least one base station circuitry, e.g. base station circuitries 420 as described above with respect to FIGS. 4 to 7, to a common radio resource 1020.

The second interface 425 is connectable to a user equipment (UE), e.g. a UE 430 as described above with respect to FIGS. 4 to 7, configured to access the common radio resource 1020 for transmission of a data frame 1021 to or from the UE 430. The BS controller 423 is configured to schedule the transmission of the data frame 1021 according to the trigger signal 1006 received from the central coordination entity 1005. The first interface 421 may be configured to receive a control signal from a central control entity, wherein the control signal indicates an allocation of one of the at least one base station circuitries 420 to be the central coordination entity 1005.

The coordinated access may be such that the access to the common radio resource 1020 is divided between the at least one base station circuitries 420. The coordinated access may be such that a transmission 1021 of a first base station circuitry 420, 1001 of the at least one base station circuitries is scheduled adjacent to a transmission 1022 of a second base station circuitry 420, 1002 of the at least one base station circuitries.

The BS controller 423 may be configured to schedule the transmission of the data frame 1022 for an immediate transmission adjacent to an available transmission slot indicated by the trigger signal.

The coordinated access may include a silence period 1023 in which none of the at least one base station circuitries 420, 1001, 1002 is allowed to access the radio resource 1020. The coordinated access may be configured to block a non-centralized base station circuitry 1003 from accessing the radio resource 1020 in periods other than the silence period 1023. The coordinated access may be configured to block a base station circuitry 1003 adapted to access the radio resource 1020 by using a contention-based protocol, in particular a WiFi radio cell or a Bluetooth radio cell, from accessing the radio resource 1020 in periods other than the silence period 1023. The trigger signal may be received from a central coordination entity 1005 of a plurality of central coordination entities which are configured to coordinate a plurality of base station circuitries 423.

FIG. 10 is a schematic diagram illustrating a first state 1000 of an efficient resource access mechanism in an LAA communication system including a central coordination entity 1005, two base station (BS) circuitries 1001, 1002 and a small cell 1103. The central coordination entity 1005 schedules a first transmission 1021 in advance that is triggered 1008 by the first base station 1001.

FIG. 11 is a schematic diagram illustrating a second state 1100 of the efficient resource access mechanism in the LAA communication system depicted in FIG. 10. The central coordination entity 1005 schedules 1106 a second transmission 1022 immediately after the first transmission 1021. The second transmission 1022 is triggered 1108 by the second base station 1002.

After the first transmission 1021, the second one 1022 follows immediately—this prevents WiFi 1003 (or any other contention based protocol) to detect the presence of the channel availability.

FIG. 12 is a schematic diagram illustrating a third state 1200 of the efficient resource mechanism in the LAA communication system depicted in FIG. 10.

A pause sequence 1023 will allow to have an orderly transition of the resource (i.e., the channel) to the WiFi system 1003 (or any other contention based protocol)—WiFi (or any other contention based protocol) will detect the availability of the channel and take the resource 1024 as required.

The "any other contention based protocol" may include any WiFi flavor such as IEEE 802.11a/b/g/ac/af/etc. as well as Bluetooth and any other system being operated in the target band. The term "stand-alone LAA" represents any type of stand-alone LAA system including LTE being operated on an unlicensed, license-by-rule or shared basis, etc.

Thanks to the approach detailed above, the central control entity 1005 is able to efficiently manage the allocation of resources across the entire heterogeneous landscape which is able to access the target frequency band, in the 5 GHz unlicensed (ISM) frequency band. Of course, this approach can be applied to any other suitable band, such as bands being available for secondary usage (e.g., TVWS bands in the frequency range of 470-790 MHz) or Shared bands such as 2.3-2.4 GHz (Licensed Shared Access in Europe).

FIGS. 13a, 13b, 13c and 13d illustrate an efficient resource access mechanism for blocking other than LAA cells from accessing a radio resource. FIGS. 13a, 13b, 13c and 13d are schematic diagrams illustrating transmissions 1300a, 1300b, 1300c, 1300d in which silence periods are filled up with dummy data according to a method for scheduling coordinated access to a radio resource.

FIG. 13 illustrates the scenario when the UL (Uplink) and/or DL (Downlink) part of the frame is (partly) unused, for example because of a lack of data to be transmitted. In particular for UL this is critical since when the UL part is minimized, a quite long silence period is added in the LTE (such as stand-alone LAA) transmission in order to address propagation delays. This silence period may be identified by WiFi systems (or any other contention based protocol) and they may take back the channel unintentionally (i.e., the central control entity actually targets to maintain the channel for stand-alone LAA systems). In the following, a mechanism is presented in which corresponding silence periods are filled up by "dummy" transmissions, such as packets containing random data. These dummy transmissions may be performed for UL and DL parts (and UL/DL pause intervals) either by the concerned infrastructure (i.e., Small Cells, Base Stations) and/or selected/all User Devices.

This is a substantial paradigm shift—even Base Stations may transmit in the UL portion (and UL/DL pause intervals) and/or User Devices may transmit in the DL portion (and UL/DL pause intervals).

The simultaneous transmissions of dummy signals by both the infrastructure (i.e., Small Cells, Base Stations) and selected/all User Devices may further alleviate the hidden node problem (or other problems) making sure that the WiFi (or any other contention based protocol) continues to detect the channel to be occupied. Instead of dummy transmissions, any other type of (useful/unuseful) transmission may occur, for example those periods may be filled up with broadcast sequences, etc. The basic principle is illustrated below.

If suitable, the stand-alone LAA system may dynamically change the allocation sequence of UL and DL, i.e. in some (selected) transmissions first UL and then DL is used and in the other transmissions first DL and then UL is used. The best allocation strategy may be identified such that, for example, the maximum system capacity is reached, the probability is minimized that other contention based access systems (such as WiFi) or any other systems operating in (part of) the same band may take the channel (or perform any other unintended action) while the central control entity has it still allocated to the stand-alone LAA (such as LTE being operated on an unlicensed, license-by-rule or shared basis, etc.) or any other suitable system.

In another implementation multiple central control entities exist and coordinate stand-alone LAA systems. In this case, the following two sub cases are considered: There is a cooperation between the central control entities, e.g. they are exchanging data through a backbone (or any other cabled/over-the-air) link or there is even a higher priority controller above those controllers (i.e., higher in the hierarchy) coordinating the concerned controller. Then, the two controllers are negotiating access slots with respect to each other. Also, they are negotiating access slots to be given to any other contention based access system (such as WiFi, etc.). This exchange of information may be triggered by one of the central controllers, requesting the initiation of a negotiation procedure. The target central controller answers to the request acknowledging its availability for negotiating a strategy for sharing the resource. Then, all concerned central controllers may exchange data on their expected needs for the resource occupancy and also the needs of other unlicensed systems (such as WiFi, etc.) may be determined (e.g. through estimation and/or observation of their channel occupancy level in the past). Then, a decision may be taken by a suitable central controller and communicated to all concerned central controllers. The various concerned central controllers may perform resource allocation in alignment to the agreed resource allocation strategy.

In case that some or all central controllers do not cooperate (e.g., they are deployed by competing stakeholders such as competing Mobile Network Operators (MNOs)), each system managed by a central controller may be considered to act as "any other contention based/unlicensed system". The same access strategy as applied for systems like WiFi may thus also be applied to other central controllers.

The resource access mechanism described above may be implemented by a base station circuitry, e.g. a BS circuitry 420 as described above with respect to FIGS. 4 to 7.

Such a base station (BS) circuitry includes a first interface, e.g. a first interface 421 as described above with respect to FIGS. 4 to 7, a second interface, e.g. a second interface 425 as described above with respect to FIGS. 4 to 7, and a BS controller, e.g. a BS controller 423 as described above with respect to FIGS. 4 to 7.

The first interface 421 is connectable to a network and configured to receive a trigger signal 1006 from a central coordination entity 1005. The trigger signal 1006 indicates a coordinated access of at least one base station circuitry, e.g. base station circuitries 420 as described above with respect to FIGS. 4 to 7, to a common radio resource 1020.

The second interface 425 is connectable to a user equipment (UE), e.g. a UE 430 as described above with respect to FIGS. 4 to 7, configured to access the common radio resource 1020 for transmission of a data frame 1021 to or from the UE 430.

The BS controller 423 is configured to schedule the transmission of the data frame 1021 according to the trigger signal 1006 received from the central coordination entity 1005 and to fill up silence periods 1302, 1313, 1322, 1323, 1332, 1333 in the data frame 1300*a*, 1300*b*, 1300*c*, 1300*d* with data indicating activity.

The BS controller 423 may be configured to fill up silence periods in both, a downlink portion and an uplink portion of the data frame with data indicating activity. The BS controller 423 may be configured to fill up the silence periods by at least one of dummy data, random data, broadcast sequences, useful data. The BS controller 423 may be configured to transmit a signaling message to the UE for signaling the UE to fill up the silence periods with data indicating activity. The common radio resource may include at least one unlicensed frequency band. The base station circuitry 423 may be a stand-alone licensed assisted access (LAA) radio cell, for example according to LTE being operated on an unlicensed, license-by-rule or shared basis.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 600, 700 and 1300 as described above with respect to FIGS. 6, 7 and 13. Such a computer program product may include a readable storage medium storing program code thereon for use by a processor, the program code comprising instructions for performing any of the methods 600, 700, 1300 as described above.

EXAMPLES

The following examples pertain to further embodiments. Example 1 is a base station (BS) circuitry, configured to adapt operation of a user equipment (UE) between a stand-alone operation mode and a mobile network operator (MNO) assisted operation mode, comprising: a first interface connectable to an MNO network; a second interface connectable to the UE; and a BS controller, configured to: transmit a first register message via the first interface to the MNO network, wherein the first register message indicates a request to operate the UE in at least one licensed frequency band of the MNO network, and signal a hand-over via the second interface to the UE, wherein the hand-over indicates a transition from operating the UE in at least one frequency band of the stand-alone operation mode to operating the UE in the at least one licensed frequency band of the MNO assisted operation mode.

In Example 2, the subject matter of Example 1 can optionally include that the request to operate the UE in an MNO assisted operation mode is autonomously generated by the base station circuitry or received from the MNO network.

In Example 3, the subject matter of any one of Examples 1-2 can optionally include that the BS controller is further configured to transmit information via the second interface to the UE, wherein the information indicates at least one link for connecting the UE, the at least one link comprises: a link through the MNO network based on licensed access technology, a link through an MNO-independent network based on WiFi, a link through the MNO-independent network based on Bluetooth, a link through the MNO-independent network based on stand-alone license-assisted access (LAA), a link through the MNO-independent network based on another access technology.

In Example 4, the subject matter of any one of Examples 1-3 can optionally include that the BS controller is configured to adapt an access technology for accessing the UE based on one of the following: 3GPP long term evolution (LTE) in a dedicated licensed band, 3GPP LAA in a combination of a dedicated licensed band and an unlicensed band, stand-alone LAA in an unlicensed band, LTE being operated on one of an unlicensed, license-by-rule or shared basis, any type of LTE being operated in a shared band such as a Spectrum Access System (SAS) band in a dedicated licensed band for incumbent usage, SAS LAA in a combination of a dedicated licensed band for incumbent usage and an unlicensed band, a combination of LTE and SAS.

In Example 5, the subject matter of any one of Examples 1-4 can optionally include that the BS controller is configured to terminate the operation of the UE in the stand-alone operation mode if the MNO network provides at least one unlicensed frequency band for operating the UE.

In Example 6, the subject matter of Example 5 can optionally include that the BS controller is configured to initiate the operation of the UE in the stand-alone operation mode if the MNO network stops providing the at least one unlicensed frequency band.

Example 7 is a user equipment (UE) operable in a stand-alone operation mode and a mobile network operator (MNO) assisted operation mode, the UE comprising: an interface connectable to a base station (BS) circuitry, in particular a base station circuitry according to one of Examples 1-6, configured to receive a hand-over signal from the base station circuitry, the hand-over signal indicating a transition from an operation of the UE in at least one frequency band of the stand-alone operation mode to an operation of the UE in at least one licensed frequency band of the MNO assisted operation mode; and a UE controller, configured to initiate a transition from operating the UE in the stand-alone operation mode to operating the UE in the MNO assisted operation mode based on the hand-over signal.

In Example 8, the subject matter of Example 7 can optionally include that the UE controller is configured to initiate a transition from operating the UE in the MNO assisted operation mode to operating the UE in the stand-alone operation mode based on a signal from the base station circuitry indicating a termination of the MNO assisted operation mode.

In Example 9, the subject matter of Example 8 can optionally include that the UE controller is configured to: detect an MNO-independent network for operating the UE in the stand-alone operation mode after reception of the signal indicating the termination of the MNO assisted operation mode; and connect the UE to the MNO-independent network.

Example 10 is a base station circuitry, comprising: a first interface connectable to a network, configured to receive a trigger signal from a central coordination entity, wherein the trigger signal indicates a coordinated access of at least onebase station circuitry to a common radio resource; a second interface connectable to a user equipment (UE), configured to access the common radio resource for transmission of a data frame to or from the UE; and a controller, configured to: schedule the transmission of the data frame according to the trigger signal received from the central coordination entity.

In Example 11, the subject matter of Example 10 can optionally include that the first interface is configured to receive a control signal from a central control entity, wherein the control signal indicates an allocation of one of the at least one base station circuitries to be the central coordination entity.

In Example 12, the subject matter of any one of Examples 10-11 can optionally include that the coordinated access is such that the access to the common radio resource is divided between the at least one base station circuitries.

In Example 13, the subject matter of any one of Examples 10-12 can optionally include that the coordinated access is such that a transmission of a first base station circuitry of the at least one base station circuitries is scheduled adjacent to a transmission of a second base station circuitry of the at least one base station circuitries.

In Example 14, the subject matter of any one of Examples 10-13 can optionally include that the BS controller is configured to schedule the transmission of the data frame for an immediate transmission adjacent to an available transmission slot indicated by the trigger signal.

In Example 15, the subject matter of any one of Examples 10-14 can optionally include that the coordinated access comprises a silence period in which none of the at least one base station circuitries is allowed to access the radio resource.

In Example 16, the subject matter of Example 15 can optionally include that the coordinated access is configured to block a non-centralized base station circuitry from accessing the radio resource in periods other than the silence period.

In Example 17, the subject matter of any one of Examples 15-16 can optionally include that the coordinated access is configured to block a base station circuitry adapted to access the radio resource by using a contention-based protocol, in particular a WiFi radio cell or a Bluetooth radio cell, from accessing the radio resource in periods other than the silence period.

In Example 18, the subject matter of any one of Examples 10-17 can optionally include that the trigger signal is received from a central coordination entity of a plurality of central coordination entities which are configured to coordinate a plurality of base station circuitries.

Example 19 is a base station (BS) circuitry, comprising: a first interface connectable to a network, configured to receive a trigger signal from a central coordination entity, wherein the trigger signal indicates a coordinated access of at least one base station circuitry to a common radio resource; a second interface connectable to a user equipment (UE), configured to access the common radio resource for transmission of a data frame to the UE; and a BS controller, configured to: schedule the transmission of the data frame according to the trigger signal received from the central coordination entity and to fill up silence periods in the data frame with data indicating activity.

In Example 20, the subject matter of Example 19 can optionally include that the BS controller is configured to fill up silence periods in both, a downlink portion and an uplink portion of the data frame with data indicating activity.

In Example 21, the subject matter of any one of Examples 19-20 can optionally include that the BS controller is configured to fill up the silence periods by at least one of dummy data, random data, broadcast sequences, useful data.

In Example 22, the subject matter of any one of Examples 19-21 can optionally include that the BS controller is configured to transmit a signaling message to the UE for signaling the UE to fill up the silence periods with data indicating activity.

In Example 23, the subject matter of any one of Examples 10-22 can optionally include that the common radio resource comprises at least one unlicensed frequency band.

In Example 24, the subject matter of any one of Examples 10-23 can optionally include that the base station circuitry is one of a stand-alone licensed assisted access (LAA) radio cell, in particular according to LTE being operated on one of an unlicensed, license-by-rule or shared basis.

Example 25 is a method for adapting operation of a user equipment (UE) between a stand-alone operation mode and a mobile network operator (MNO) assisted operation mode, the method comprising: transmitting a first register message to a MNO network, wherein the first register message indicates a request to operate the UE in at least one licensed frequency band of the MNO network, and signaling a hand-over to the UE, wherein the hand-over indicates a transition from operating the UE in at least one unlicensed frequency band of the stand-alone operation mode to operating the UE in the at least one licensed frequency band of the MNO assisted operation mode.

In Example 26, the subject matter of Example 25 can optionally include that the request to operate the UE in an MNO assisted operation mode is autonomously generated by the base station circuitry or received from the MNO network.

In Example 27, the subject matter of Example 25 or 26 can optionally include: transmitting information to the UE, wherein the information indicates at least one link for connecting the UE, the at least one link comprises: a link through the MNO network based on licensed access technology, a link through an MNO-independent network based on WiFi, a link through the MNO-independent network based on Bluetooth, a link through the MNO-independent network based on stand-alone license-assisted access (LAA), a link through the MNO-independent network based on another access technology.

In Example 28, the subject matter of Example 25 can optionally include: adapting an access technology for accessing the UE based on one of the following: 3GPP long term evolution (LTE) in a dedicated licensed band, 3GPP LAA in a combination of a dedicated licensed band and an unlicensed band, stand-alone LAA in an unlicensed band, LTE being operated on one of an unlicensed, license-by-rule or shared basis, Spectrum Access System (SAS) in a dedicated licensed band for incumbent usage, SAS LAA in a combination of a dedicated licensed band for incumbent usage and an unlicensed band, a combination of LTE and SAS.

In Example 29, the subject matter of Example 25 can optionally include: terminating the operation of the UE in the stand-alone operation mode if the MNO network provides at least one unlicensed frequency band for operating the UE.

In Example 30, the subject matter of Example 29 can optionally include: initiating the operation of the UE in the stand-alone operation mode if the MNO network stops providing the at least one unlicensed frequency band.

Example 31 is a method for operating a user equipment (UE) in a stand-alone operation mode and a mobile network operator (MNO) assisted operation mode, the method comprising: receiving a hand-over signal from a base station circuitry, the hand-over signal indicating a transition from an operation of the UE in at least one unlicensed frequency band of the stand-alone operation mode to an operation of the UE in at least one licensed frequency band of the MNO assisted operation mode; and initiating a transition from operating the UE in the stand-alone operation mode to operating the UE in the MNO assisted operation mode based on the hand-over signal.

In Example 32, the subject matter of Example 31 can optionally include: initiating a transition from operating the UE in the MNO assisted operation mode to operating the UE in the stand-alone operation mode based on a signal from the base station circuitry indicating a termination of the MNO assisted operation mode.

In Example 33, the subject matter of Example 32 can optionally include: detecting an MNO-independent network for operating the UE in the stand-alone operation mode after reception of the signal indicating the termination of the MNO assisted operation mode; and connecting the UE to the MNO-independent network.

Example 34 is a method, comprising: receiving a trigger signal from a central coordination entity, wherein the trigger signal indicates a coordinated access of at least onebase station circuitry to a common radio resource; accessing the common radio resource for transmission of a data frame to or from the UE; and scheduling the transmission of the data frame according to the trigger signal received from the central coordination entity.

In Example 35, the subject matter of Example 34 can optionally include: receiving a control signal from a central control entity, wherein the control signal indicates an allocation of one of the at least one base station circuitries to be the central coordination entity.

In Example 36, the subject matter of Example 34 can optionally include that the coordinated access is such that the access to the common radio resource is divided between the at least one base station circuitries.

In Example 37, the subject matter of Example 34 can optionally include that the coordinated access is such that a transmission of a first base station circuitry of the at least one base station circuitries is scheduled adjacent to a transmission of a second base station circuitry of the at least one base station circuitries.

In Example 38, the subject matter of Example 34 can optionally include: scheduling the transmission of the data frame for an immediate transmission adjacent to an available transmission slot indicated by the trigger signal.

In Example 39, the subject matter of Example 34 can optionally include that the coordinated access comprises a silence period in which none of the at least one base station circuitries is allowed to access the radio resource.

In Example 40, the subject matter of Example 39 can optionally include that the coordinated access is configured to block a non-centralized base station circuitry from accessing the radio resource in periods other than the silence period.

In Example 41, the subject matter of Example 39 can optionally include that the coordinated access is configured to block a base station circuitry adapted to access the radio resource by using a contention-based protocol, in particular a WiFi radio cell or a Bluetooth radio cell, from accessing the radio resource in periods other than the silence period.

In Example 42, the subject matter of Example 34 can optionally include that the trigger signal is received from a central coordination entity of a plurality of central coordination entities which are configured to coordinate a plurality of base station circuitries.

Example 43 is a method, comprising: receiving a trigger signal from a central coordination entity, wherein the trigger signal indicates a coordinated access of at least one base station circuitry to a common radio resource; accessing the common radio resource for transmission of a data frame to the UE; and scheduling the transmission of the data frame according to the trigger signal received from the central coordination entity and to fill up silence periods in the data frame with data indicating activity.

In Example 44, the subject matter of Example 43 can optionally include: filling up silence periods in both, a downlink portion and an uplink portion of the data frame with data indicating activity.

In Example 45, the subject matter of Example 43 can optionally include: filling up the silence periods by at least one of dummy data, random data, broadcast sequences, useful data.

In Example 46, the subject matter of Example 43 can optionally include: transmitting a signaling message to the UE for signaling the UE to fill up the silence periods with data indicating activity.

In Example 47, the subject matter of Example 43 can optionally include that the common radio resource comprises at least one unlicensed frequency band.

In Example 48, the subject matter of Example 43 can optionally include that the base station circuitry is one of a stand-alone licensed assisted access (LAA) radio cell, in particular according to LTE being operated on one of an unlicensed, license-by-rule or shared basis.

Example 49 is a computer readable non-transitory medium on which computer instructions are stored which when executed by a computer, cause the computer to perform the method of one of Examples 25 to 48.

Example 50 is a device for adapting operation of a user equipment (UE) between a stand-alone operation mode and a mobile network operator (MNO) assisted operation mode, the device comprising: means for transmitting a first register message to a MNO network, wherein the first register message indicates a request to operate the UE in at least one licensed frequency band of the MNO network, and means for signaling a hand-over to the UE, wherein the hand-over indicates a transition from operating the UE in at least one unlicensed frequency band of the stand-alone operation mode to operating the UE in the at least one licensed frequency band of the MNO assisted operation mode.

In Example 51, the subject matter of Example 50 can optionally include that the request to operate the UE in an MNO assisted operation mode is autonomously generated by the base station circuitry or received from the MNO network.

Example 52 is a base station (BS) system, comprising: a first subsystem connectable to a network, configured to receive a trigger signal from a central coordination entity, wherein the trigger signal indicates a coordinated access of at least one base station circuitry to a common radio resource; a second subsystem connectable to a user equipment (UE), configured to access the common radio resource for transmission of a data frame to the UE; and a third subsystem, configured to: schedule the transmission of the data frame according to the trigger signal received from the central coordination entity and to fill up silence periods in the data frame with data indicating activity.

In Example 53, the subject matter of Example 52 can optionally include that the third subsystem is configured to fill up silence periods in both, a downlink portion and an uplink portion of the data frame with data indicating activity.

In Example 54, the subject matter of Example 1 can optionally include that the at least one frequency band of the stand-alone operation mode is one of an unlicensed frequency band, a license-by-rule frequency band, a shared frequency band, a TV White Space (TVWS) frequency band or any other suitable type of frequency.

In Example 55, the subject matter of any one of Examples 1-2 can optionally include that the BS controller is configured to signal an inverse hand-over via the second interface to the UE, wherein the inverse hand-over indicates a retransition from operating the UE in the at least one licensed frequency band of the MNO assisted operation mode to operating the UE in the stand-alone operation mode.

In Example 56, the subject matter of Example 7 can optionally include that the at least one frequency band of the stand-alone operation mode is one of an unlicensed frequency band, a license-by-rule frequency band, a shared frequency band, a TV White Space (TVWS) frequency band or any other suitable type of frequency.

In Example 57, the subject matter of Example 7 or Example 56 can optionally include that the UE controller is configured to initiate a retransition from operating the UE in the at least one licensed frequency band of the MNO assisted operation mode to operating the UE in the stand-alone operation mode when receiving an inverse hand-over signal from the BS circuitry via the interface.

Example 58 is a user equipment (UE), operable in a stand-alone operation mode and a mobile network operator (MNO) assisted operation mode, the UE comprising: an interface connectable to a base station (BS) circuitry, in particular a base station circuitry according to one of Examples 1 to 6; and a UE controller, configured to initiate a transition from operating the UE in at least one frequency band of the stand-alone operation mode to an operation of the UE in at least one licensed frequency band of the MNO assisted operation mode, wherein the UE controller is configured to connect the interface to the BS circuitry when operating the UE in the at least one licensed frequency band of the MNO assisted operation mode.

In Example 59, the subject matter of Example 58 can optionally include that the at least one frequency band of the stand-alone operation mode is one of an unlicensed frequency band, a license-by-rule frequency band, a shared frequency band, a TV White Space (TVWS) frequency band or any other suitable type of frequency.

In Example 60, the subject matter of Example 58 or Example 59 can optionally include that the UE controller is configured to initiate a retransition from operating the UE in the at least one licensed frequency band of the MNO assisted operation mode to operating the UE in the stand-alone operation mode.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A base station (BS) circuitry, configured to adapt operation of a user equipment (UE) between a stand-alone operation mode and a mobile network operator (MNO) assisted operation mode, comprising:
a first interface connectable to an MNO network;
a second interface connectable to the UE; and
a BS controller, configured to:
transmit a register message via the first interface to the MNO network, wherein the register message indicates a request to operate the UE in at least one frequency band of the MNO network while the UE operates in the stand-alone operation mode that includes the UE performing license-assisted access (LAA) using a license-by-rule frequency band and without using a frequency carrier that is associated with at least one licensed frequency band of the MNO network for transmitting or receiving, and
upon the BS being registered with the MNO network, signal a hand-over via the second interface to the UE, wherein the hand-over indicates a transition from operating the UE in the stand-alone operation mode to operating the UE (i) in accordance with 3GPP long term evolution (LTE) using at least one licensed frequency band of the MNO assisted operation mode, or (ii) in accordance with 3GPP license-assisted access (LAA) using a combination of an unlicensed band and at least one licensed frequency band of the MNO assisted operation mode.

2. The base station circuitry of claim 1, wherein the at least one frequency band of the stand-alone operation mode further includes at least one of an unlicensed frequency band, a shared frequency band, or a TV White Space (TVWS) frequency band.

3. The base station circuitry of claim 1, wherein the BS controller is configured to signal an inverse hand-over via the second interface to the UE, wherein the inverse hand-over indicates a retransition from operating the UE in the at least one licensed frequency band of the MNO assisted operation mode to operating the UE in the stand-alone operation mode.

4. The base station circuitry of claim 1, wherein the register message to request to operate the UE in the at least one frequency band of the MNO network is autonomously generated by the base station circuitry or received from the MNO network.

5. The base station circuitry of claim 1, wherein the BS controller is further configured to transmit information via the second interface to the UE, and
wherein the information indicates at least one link for connecting the UE, the at least one link comprises one or more of:
a link through the MNO network based on licensed access technology,
a link through an MNO-independent network based on WiFi,
a link through the MNO-independent network based on Bluetooth,
a link through the MNO-independent network based on stand-alone license-assisted access (LAA), and
a link through the MNO-independent network based on another access technology.

6. The base station circuitry of claim 1, wherein the BS controller is configured to adapt an access technology for accessing the UE based on at least one of the following:
3GPP long term evolution (LTE) in a dedicated licensed band,
3GPP LAA in a combination of a dedicated licensed band and an unlicensed band,
stand-alone LAA in an unlicensed band,
LTE being operated on one of an unlicensed, license-by-rule or shared basis,
LTE being operated in a shared band including a Spectrum Access System (SAS) band in a dedicated licensed band for incumbent usage,
SAS LAA in a combination of a dedicated licensed band for incumbent usage and an unlicensed band, and
a combination of LTE and SAS.

7. The base station circuitry of claim 1, wherein the BS controller is configured to terminate the operation of the UE in the stand-alone operation mode if the MNO network provides at least one unlicensed frequency band for operating the UE.

8. The base station circuitry of claim 7, wherein the BS controller is configured to initiate the operation of the UE in the stand-alone operation mode if the MNO network stops providing the at least one unlicensed frequency band.

9. The base station circuitry of claim 1, wherein the stand-alone operation mode includes the UE performing LAA without the frequency carrier that is associated with the at least one licensed frequency band being operated jointly, sequentially in time, or simultaneously in time with the at least one frequency band of the stand-alone operation mode.

10. The base station circuitry of claim 1, wherein the BS controller is further configured to transmit, prior to signaling the hand-over, information via the second interface to the UE that indicates a list of available links for connecting the UE, the available links including (i) a link through the MNO network based on licensed access technology, (ii) a link through an MNO-independent network based on WiFi, (iii) a link through the MNO-independent network based on Bluetooth, and (iv) a link through the MNO-independent network based on stand-alone license-assisted access (LAA).

11. The base station circuitry of claim 1, wherein:
the first interface is part of a citizens broadband radio service device (CBSD),
the MNO network is configured to function as a network manager, and
the first interface is configured to enable communications between the CBSD and the network manager.

12. A user equipment (UE), operable in a stand-alone operation mode and a mobile network operator (MNO) assisted operation mode, the UE comprising:
an interface connectable to a base station (BS) circuitry, the interface configured to receive a hand-over signal from the base station circuitry during operation of the UE in the stand-alone operation mode that includes the UE performing license-assisted access (LAA) using a license-by-rule frequency band and without using a frequency carrier that is associated with at least one licensed frequency band of the MNO network for transmitting or receiving, the hand-over signal indicating a transition from an operation of the UE in the stand-alone operation mode to an operation of the UE (i) in accordance with 3GPP long term evolution (LTE) using at least one licensed frequency band of the MNO assisted operation mode, or (ii) in accordance with 3GPP license-assisted access (LAA) using a combination of an unlicensed band and at least one licensed frequency band of the MNO assisted operation mode; and
a UE controller configured to initiate a transition from operating the UE in the stand-alone operation mode to operating the UE in the MNO assisted operation mode based on the hand-over signal.

13. The UE of claim 12, wherein at least one frequency band of the stand-alone operation mode further includes at least one of an unlicensed frequency band, a shared frequency band, or a TV White Space (TVWS) frequency band.

14. The UE of claim 12, wherein the UE controller is configured to initiate a retransition from operating the UE in the at least one licensed frequency band of the MNO assisted operation mode to operating the UE in the stand-alone operation mode when receiving an inverse hand-over signal from the BS circuitry via the interface.

15. The UE of claim 12, wherein the UE controller is configured to initiate a transition from operating the UE in the MNO assisted operation mode to operating the UE in the stand-alone operation mode based on a signal from the base station circuitry indicating a termination of the MNO assisted operation mode.

16. The UE of claim 15, wherein the UE controller is configured to detect an MNO-independent network for operating the UE in the stand-alone operation mode after reception of the signal indicating the termination of the MNO assisted operation mode, and to connect the UE to the MNO-independent network.

* * * * *